(12) United States Patent
Kimura et al.

(10) Patent No.: US 8,999,607 B2
(45) Date of Patent: Apr. 7, 2015

(54) MANUFACTURING METHOD OF SOLID OXIDE FUEL CELL, AND MANUFACTURING METHOD OF COMPACT OF DIVIDED MEMBER OF THE CELL

(75) Inventors: Takuji Kimura, Kariya (JP); Kunihiko Yoshioka, Nagoya (JP); Makoto Ohmori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1010 days.

(21) Appl. No.: 12/959,495

(22) Filed: Dec. 3, 2010

(65) Prior Publication Data

US 2011/0159408 A1 Jun. 30, 2011

(30) Foreign Application Priority Data

Dec. 24, 2009 (JP) ................................. 2009-291870

(51) Int. Cl.
*H01M 8/00* (2006.01)
*H01M 8/02* (2006.01)
*H01M 4/88* (2006.01)
(Continued)

(52) U.S. Cl.
CPC .......... *H01M 8/0236* (2013.01); *H01M 4/8885* (2013.01); *H01M 8/1213* (2013.01); *H01M 8/1226* (2013.01); *H01M 4/9033* (2013.01); *H01M 4/9066* (2013.01); *H01M 8/1253* (2013.01); *H01M 2008/1293* (2013.01); *Y02E 60/521* (2013.01); *Y02E 60/525* (2013.01)

(58) Field of Classification Search
CPC . H01M 8/0228; H01M 8/023; H01M 8/0234; H01M 8/0243
USPC .......... 429/452, 465, 479, 535, 457, 514, 518
See application file for complete search history.

(56) References Cited

U.S. PATENT DOCUMENTS 5,846,664 A 12/1998 Third et al.
5,942,347 A * 8/1999 Koncar et al. ................. 429/460
(Continued)

FOREIGN PATENT DOCUMENTS

JP 06-005295 A1 1/1994
JP 07-073889 A1 3/1995
(Continued)

OTHER PUBLICATIONS

Extended European Search Report (Application No. 10839158.2) dated Jun. 6, 2014.

*Primary Examiner* — Milton I Cano
*Assistant Examiner* — Jimmy K Vo
(74) *Attorney, Agent, or Firm* — Burr & Brown, PLLC

(57) ABSTRACT

A compact of a support-member divided-member, which has a shape formed by dividing a support member into two in the thickness direction so as to divide the fuel channel into two in the thickness direction, is manufactured by a gel cast method in which slurry is filled in a molding die. A compact of a fuel-side electrode and a compact of an electrolyte are successively stacked on the upper surface of the compact of the support-member divided-member, whereby a compact of a cell divided member is obtained. The two compacts of the cell divided member are bonded and sintered, whereby an SOFC cell (sintered body) in which an oxygen-side electrode is not formed is formed. A compact of the oxygen-side electrode is formed respectively on the upper and lower surfaces of the sintered body, and then, the compact of the oxygen-side electrode is sintered, whereby the SOFC cell is completed.

10 Claims, 20 Drawing Sheets

(51) Int. Cl.
*H01M 8/12* (2006.01)
*H01M 4/90* (2006.01)

(56) References Cited

U.S. PATENT DOCUMENTS

| | | | |
|---|---|---|---|
| 6,183,609 B1 * | 2/2001 | Kawasaki et al. | 204/252 |
| 2002/0142210 A1 | 10/2002 | Kaiser et al. | |
| 2008/0008923 A1 * | 1/2008 | Numao | 429/38 |
| 2009/0011328 A1 | 1/2009 | Yamaguchi et al. | |
| 2009/0253014 A1 * | 10/2009 | Tanahashi et al. | 429/30 |

FOREIGN PATENT DOCUMENTS

| | | |
|---|---|---|
| JP | 2002-313350 A1 | 10/2002 |
| JP | 2007-095383 A1 | 4/2007 |
| WO | 2009/082402 A1 | 7/2009 |

\* cited by examiner

MANUFACTURING METHOD OF SOLID OXIDE FUEL CELL, AND MANUFACTURING METHOD OF COMPACT OF DIVIDED MEMBER OF THE CELL

BACKGROUND OF THE INVENTION

1. Field of the Invention

The present invention relates to a manufacturing method of a solid oxide fuel cell (sintered body), and a manufacturing method of a compact of a divided member of the cell. In the present specification, the "compact" means the state before the sintering.

2. Description of the Related Art

There has conventionally been known a cell (single cell) of a solid oxide fuel cell (SOFC) including a fuel-side electrode, a solid electrolyte, and an oxygen-side electrode, which are successively stacked on a plate-like support member (conductive member) having a fuel channel formed therein (see, for example, Japanese Unexamined Patent Application No. 2007-95383). A fuel gas (hydrogen gas, etc.) is supplied to the fuel channel in the support member, and a gas (air, etc.) containing oxygen is supplied to the oxygen-side electrode, whereby a potential difference is produced between the fuel-side electrode and the oxygen-side electrode based upon a difference in concentration of oxygen ion in the solid electrolyte.

Japanese Unexamined Patent Application No. 2007-95383 described above discloses a manufacturing method of the SOFC cell as described below. Specifically, a compact of a support-member divided-member, which is obtained by dividing a plate-like support member having a fuel channel formed therein into two (so as to divide the fuel channel into two in the thickness direction), is manufactured by a press molding. A channel pattern corresponding to the fuel channel is formed on the lower surface of the compact of the support-member divided-member. In the press molding, powder of a raw material of the support member is injected into a molding die having the pattern corresponding to the channel pattern formed on a molding surface at the bottom wall, and the powder of the raw material is pressed by a press molding machine with a predetermined pressure.

Next, two compacts of the support-member divided-member, which are manufactured as described above and taken out of the molding die, are prepared. The two compacts of the support-member divided-member are bonded to each other with a predetermined bonding agent in such a manner that the surfaces having the channel pattern formed thereon are agreed with each other, whereby a bonded compact of the support member is formed.

Then, a compact of a fuel-side electrode, and a compact of a solid electrolyte are successively formed on the bonded compact, whereby a stacked compact is formed. The stacked compact is sintered, so that a stacked sintered body is formed. Next, a compact of an oxygen-side electrode is formed on the solid electrolyte of the stacked sintered body. Then, the compact of the oxygen-side electrode is sintered, whereby an SOFC cell in which "the fuel-side electrode, the solid electrolyte, and the oxygen-side electrode are successively stacked on the plate-like support member having the fuel channel formed therein" is formed.

The reason why the method of bonding two compacts of the support-member divided-member manufactured by the press molding is employed to manufacture the compact of the support member having the fuel channel formed therein by the press molding is because the degree of freedom in the shape of the fuel channel is increased, and hence, the fuel channel having the complicated shape can easily be formed.

In the method described in Japanese Unexamined Patent Application No. 2007-95383, the compact of the support-member divided-member is formed by the press molding of the powder of the raw material. In general, in the press molding, a fine powder of the raw material (primary particle) is processed beforehand into a relatively coarse group (granular body, secondary particle) with the use of a spray drying method in order to facilitate the press molding, and the secondary particle is pressed to form the press-molded body. Specifically, the press-molded body is composed of the secondary particles. Therefore, the support member (sintered body) formed by sintering the press-molded body is also composed of the secondary particles, so that the diameter of the secondary particle constituting the support member (sintered body) is relatively large such as about 80 µm. Because of this, the number of contacts at the interface between the support member (the sintered body of the press-molded body) and the fuel-side electrode is reduced, whereby it is difficult to secure the sufficient contact area at the interface. Therefore, a satisfactory electrical connection between both of them is difficult to be secured. As a result, the electric resistance (ohmic resistance) as the whole SOFC cell is relatively increased, which might entail a problem that the output density of the whole SOFC tends to be relatively low.

Further, in the method described in Japanese Unexamined Patent Application No. 2007-95383, the compact of the fuel-side electrode and the compact of the solid electrolyte are successively formed on the bonded compact of the support member, which is formed by bonding two compacts of the support-member divided-member taken out of the molding die to each other. When the respective compacts are formed on the bonded compact of the support member, the respective compacts are generally pressed from above in the thickness direction in order to prevent the peeling of the respective compacts. However, the bonded compact of the support member has not yet been sintered, so that it is relatively easy to be warped when it receives external force, and it may be damaged due to a crack. In particular, the fuel channel (cavity) is formed in the bonded compact of the support member. Therefore, the warpage is easy to be caused on the portion in the vicinity of the region of the bonded compact where the fuel channel is formed when it receives the contraction force in the thickness direction, resulting in that it may be damaged due to a crack. Accordingly, in the press molding, the degree of freedom in designing the shape of the fuel channel is restricted, and it is difficult to enhance the output density of the cell.

SUMMARY OF THE INVENTION

The present invention aims to provide a manufacturing method of an SOFC cell (sintered body) having a gas channel formed in a support member, wherein an electric resistance of the whole cell is relatively small, and the support member is difficult to be warped and cracked, and a manufacturing method of a compact (before the sintering) of a divided member of the same cell. The compact of the divided member of the SOFC cell is bonded later to another compact of the divided member of the SOFC cell to form an SOFC cell.

With the manufacturing method of a compact of a divided member of an SOFC cell according to the present invention, a compact of a divided member of an SOFC cell in which at least a compact of a solid electrolyte is stacked on an upper surface of "a compact of a support-member divided-member, which is the compact of the support-member divided-member formed by (having the shape formed by) dividing a plate-like support member having a gas channel formed therein in the thickness direction, and which has a channel pattern corresponding to the gas channel formed on its lower surface" is manufactured.

The manufacturing method includes a molding process in which ceramic slurry containing at least ceramic powder, dispersion media, and gelling agent is injected to a molding die having a pattern corresponding to the channel pattern formed on a molding surface at its bottom wall, and the slurry is molded and hardened to obtain the compact of the support-member divided-member; a stacking process in which at least a compact of a solid electrolyte is formed on the upper surface of the compact of the support-member divided-member in a state in which the upper surface of the compact of the support-member divided-member is exposed, and the compact of the support-member divided-member is accommodated in the molding die or a die that is different from the molding die having the pattern corresponding to the channel pattern formed on its bottom wall, in order to form a stacked compact; and a mold release process in which the molding die or the die different from the molding die is removed from the stacked compact to form the compact of the divided member of the solid oxide fuel cell. The method of forming a compact by molding the ceramic slurry, which contains the ceramic powder, the dispersion media, and the gelling agent, with the use of a molding die is also referred to as a "gel cast method".

In the manufacturing method described above, in the stacking process, the one in which a compact of a fuel-side electrode is formed on the upper surface of the compact of the support-member divided-member, and the compact of the solid electrolyte is formed on the upper surface of the compact of the fuel-side electrode may be formed as the stacked compact. Alternatively, when the compact of the support-member divided-member also serving as the compact of the fuel-side electrode is formed in the molding process, the one in which the compact of the solid electrolyte is formed on the upper surface of the compact of the support-member divided-member may be formed in the stacking process as the stacked compact.

As described above, in the manufacturing method according to the present invention, the compact of the support-member divided-member is formed by using the gel cast method. The sintered body formed by sintering the compact, which is formed by the gel cast method, is generally composed of the primary particle. Specifically, the diameter of the particle (primary particle) constituting the sintered body is sufficiently small compared to the diameter (about 80 μm) of the particle (secondary particle) constituting the sintered body formed through the press molding. The diameter of the primary particle means a median size measured with the use of a size distribution measuring apparatus of a laser diffraction scattering type. Therefore, when the manufacturing method of the present invention is employed, the number of contacts on the interface between the support member (the sintered body of the compact by the gel cast method) and the fuel-side electrode (or the solid electrolyte) is increased, compared to the case in which the method described in Japanese Unexamined Patent Application No. 2007-95383 is employed, whereby the greater contact area can be secured on the interface. Accordingly, the electrical connection between both of them is easy to be secured. As a result, the electric resistance (ohmic resistance) of the whole SOFC cell is further reduced, with the result that the output density of the whole SOFC can be increased.

In the manufacturing method described above, at least the compact of the solid electrolyte is formed on the upper surface of the compact of the support-member divided-member in the state in which the compact of the support-member divided-member is accommodated in the molding die or the die different from the molding die. Therefore, even if the respective compacts are pressed from above in the thickness direction of the compact of the support-member divided-member in order to prevent the peeling of the respective compacts upon the formation of the respective compacts on the compact of the support-member divided-member, the whole region of the lower surface (i.e., the irregular surface on which the channel pattern is formed) of the compact of the support-member divided-member is in contact with the bottom wall (i.e., the surface on which the pattern corresponding to the channel pattern is formed, the irregular surface) of the molding die or the die different from the molding die. Therefore, the compact of the support-member divided-member cannot be warped.

As described above, when the SOFC cell is formed by utilizing the compact of the divided member of the SOFC cell formed by the manufacturing method of the present invention, the SOFC cell (sintered body), which has the gas channel formed in the support member, has relatively small electric resistance as the whole cell, and in which the support member is difficult to be warped, can be manufactured.

Specifically, in the manufacturing method of the SOFC cell according to the present invention, two compacts of the divided member of the SOFC cell, which are manufactured by the manufacturing method of a compact of a divided member of an SOFC cell described above, are firstly bonded to each other in such a manner that the surfaces having the channel pattern formed thereon agree with each other, and then, the bonded compact is sintered, whereby a bonded stacked body having at least solid electrolyte formed on the upper and lower surfaces of the support member is formed. Alternatively, the two compacts of the divided member of the SOFC cell manufactured as described above are firstly sintered, and then, the two divided members of the SOFC cell manufactured through the sintering process are bonded to each other in such a manner that the surfaces having the channel pattern formed thereon agree with each other, and then, the bonded compact is sintered, whereby the bonded stacked body is formed. Then, a compact of an oxygen-side electrode is formed on the upper and lower surfaces of the bonded stacked body, and then, the compact of the oxygen-side electrode is sintered, whereby the SOFC cell is formed. Thus, the SOFC cell in which at least the solid electrolyte and the oxygen-side electrode are stacked respectively on the upper and the lower surfaces of the support member is formed. The shape of the two compacts of the divided member of the SOFC cell may be the same or may be different from each other.

Alternatively, instead of bonding the two compacts (=stacked compacts) of the divided member of the SOFC cell, a single compact (=stacked compact) of the divided member of the SOFC cell and a single compact (=individual compact) of the support-member divided-member are bonded to each other, whereby an SOFC cell in which at least the solid electrolyte and the oxygen-side electrode are stacked on only one of the upper and lower surfaces of the support member can also be formed.

Alternatively, instead of bonding two compacts (=stacked compact) of the divided member of the SOFC cell having the channel pattern formed thereon, a single compact (=stacked compact) of the divided member of the SOFC cell having the channel pattern formed thereon and a single compact (=stacked compact) of the divided member of the SOFC cell having no channel pattern formed thereon are bonded to each other, whereby an SOFC cell in which at least the solid electrolyte and the oxygen-side electrode are stacked on both the upper and lower surfaces of the support member can also be formed.

Alternatively, instead of bonding a single compact (=stacked compact) of the divided member of the SOFC cell having the channel pattern formed thereon and a single compact (=individual compact) of the support-member divided-member having the channel pattern formed thereon, a single compact (=stacked compact) of the divided member of the SOFC cell having no channel pattern formed thereon and a single compact (=individual compact) of the support-member divided-member having the channel pattern formed thereon are bonded, whereby an SOFC cell in which at least the solid electrolyte and the oxygen-side electrode are stacked on only one of the upper and lower surfaces of the support member can also be formed.

Alternatively, instead of bonding a single compact (=stacked compact) of the divided member of the SOFC cell having the channel pattern formed thereon and a single compact (=individual compact) of the support-member divided-member having the channel pattern formed thereon, a single compact (=stacked compact) of the divided member of the SOFC cell having the channel pattern formed thereon and a single compact (=individual compact) of the support-member divided-member having no channel pattern formed thereon are bonded, whereby an SOFC cell in which at least the solid electrolyte and the oxygen-side electrode are stacked on only one of the upper and lower surfaces of the support member can also be formed.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE PRESENT INVENTION (Structure of SOFC Cell)

Figure 1:
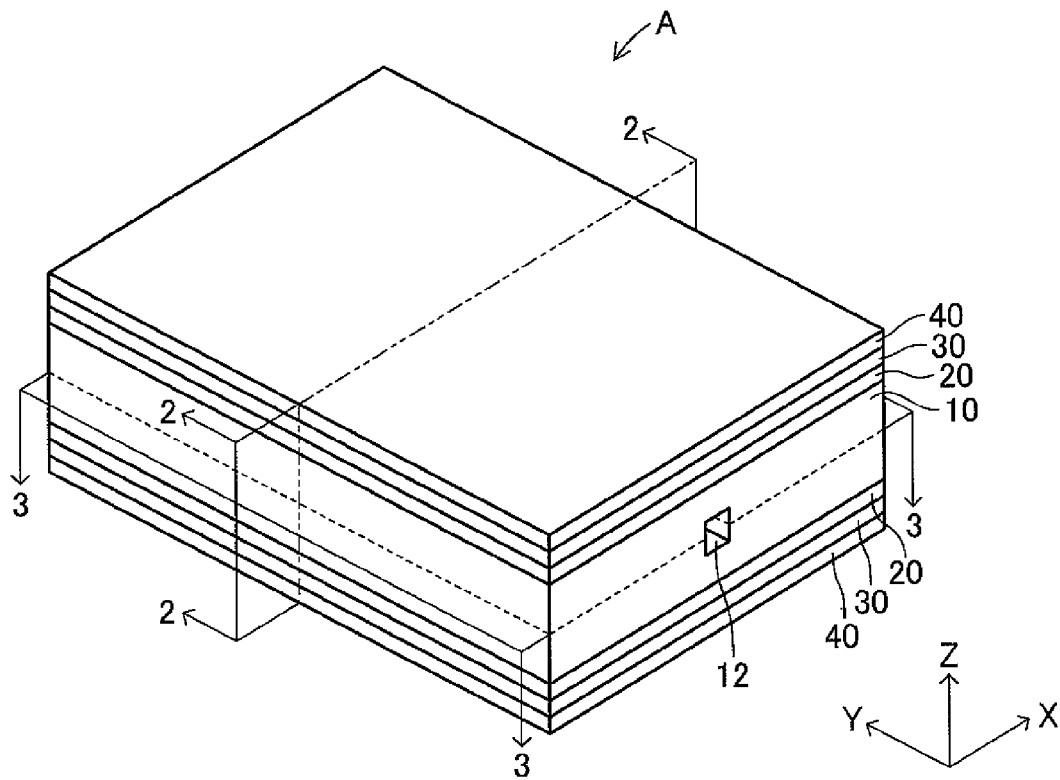
FIG. 1 is a perspective view illustrating an SOFC cell manufactured by a manufacturing method of an SOFC cell according to an embodiment of the present invention.
Figure 2:
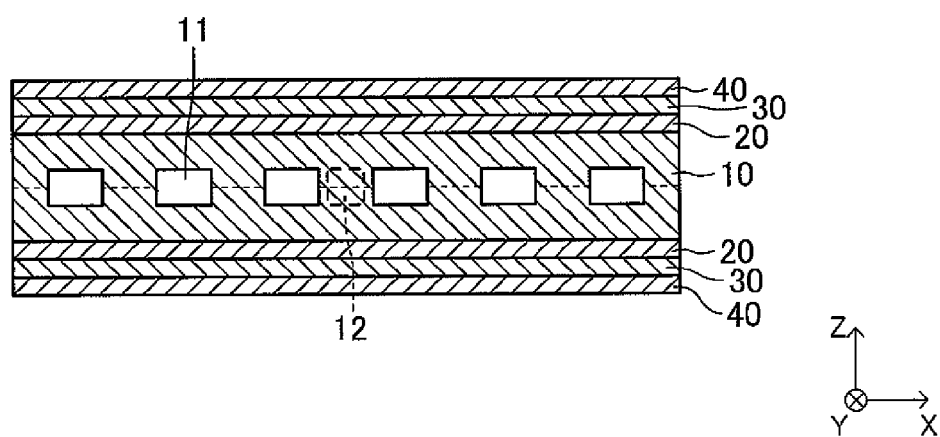
FIG. 2 is a sectional view illustrating a section obtained by cutting the SOFC cell illustrated in FIG. 1 along a plane that includes 2-2 line and that is parallel to an X-Z plane.
Figure 3:
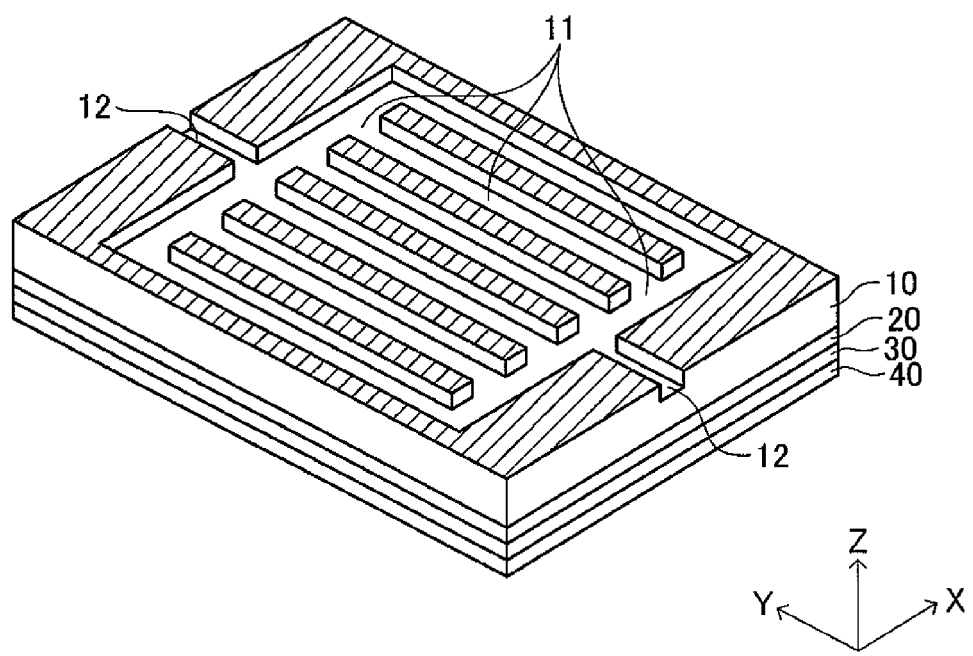
FIG. 3 is a sectional view illustrating a section obtained by cutting the SOFC cell illustrated in FIG. 1 along a plane that includes 3-3 line and that is parallel to an X-Y plane.

FIGS. 1 to 3 illustrate an SOFC cell A manufactured by a manufacturing method of an SOFC cell according to an embodiment of the present invention. The SOFC cell A includes a plate-like support member 10 that functions as a support substrate (a member having the highest rigidity). A plate-like fuel-side electrode 20, an electrolyte 30, and an oxygen-side electrode 40 are successively stacked onto the support plate 10 in the upward direction (in the Z-axis positive direction). Similarly, the plate-like fuel-side electrode 20, the electrolyte 30, and the oxygen-side electrode 40 are successively stacked on the support member 10 in the downward direction (in the Z-axis negative direction).

The shape (planar shape) of each member constituting the SOFC cell A viewed from the top is the same, and in the present embodiment, it is a rectangle having a long side of 5 to 30 cm, and a short side of 3 to 15 cm. The planar shape may be a square having a side of 1 to 10 cm, or a circle having a diameter of 10 cm. The planar shape of each member may be different from each other. A fillet may be performed on each corner illustrated in FIGS. 1 to 3.

The support member 10 is a porous sintered body having a plate-like shape composed of nickel oxide NiO and/or nickel Ni and yttria stabilized zirconia YSZ. The thickness of the support member 10 is 0.5 to 5.0 mm. The thickness of the support member 10 is the greatest among the respective components of the SOFC cell A. The volume ratio of the Ni and/or NiO in the whole support member 10 is 35 to 55 vol. % in terms of Ni, and the volume ratio of YSZ in the whole support member 10 is 45 to 65 vol. %. A median size of Ni and/or NiO is 0.1 to 5.0 pan, and the median size of YSZ is 0.1 to 5.0 μm.

As can be understood from FIGS. 2 and 3, a fuel channel 11 (cavity) through which a fuel gas flows is formed in the support member 10. A pair of openings 12, 12 that communicates the outside and the fuel channel 11 is formed. As described later, the support member 10 is formed by bonding two compacts 10*dg* of a support-member divided-member, which is obtained by dividing the support member 10 into two in the thickness direction (in the Z-axis direction), and by sintering the resultant.

The fuel-side electrode 20 (anode electrode) is, like the support member 10, a porous sintered body having a thin plate-like shape composed of nickel oxide NiO and/or nickel Ni and yttria stabilized zirconia YSZ. The thickness of the fuel-side electrode 20 is 5.0 to 30 μm. The volume ratio of the Ni and/or NiO in the whole fuel-side electrode 20 is 25 to 50 vol. % in terms of Ni, and the volume ratio of YSZ in the whole fuel-side electrode is 50 to 75 vol. %. As described above, the content percentage (volume %) of the YSZ in the fuel-side electrode 20 is greater than that in the support member 10.

The support member 10 can mainly be used for taking the electrons, which are obtained through the reaction represented by a later-described formula (2) in the fuel-side electrode 20, to the outside. From this meaning, the support member 10 is also referred to as a fuel electrode current-collecting layer, and the fuel-side electrode 20 is also referred to as a fuel electrode active layer.

The electrolyte 30 is a dense sintered body having a thin plate-like shape composed of YSZ. The thickness of the electrolyte 30 is 1.0 to 30 μm.

The oxygen-side electrode 40 (cathode electrode) is a porous sintered body having a thin plate-like shape and made of lanthanum strontium cobalt ferrite LSCF ($La_{0.6}Sr_{0.4}CO_{0.2}Fe_{0.8}O_3$). The thickness of the oxygen-side electrode 40 is 5.0 to 50.0 μm.

A reaction preventing layer may be interposed between the electrolyte 30 and the oxygen-side electrode 40 in order to prevent the occurrence of the phenomenon in which an electric resistance between the electrolyte 30 and the oxygen-side electrode 40 increases through the reaction between the YSZ in the electrolyte 30 and the strontium in the oxygen-side electrode 40 during the fabrication of the cell or in the cell A, which is currently operated, of the SOFC. The reaction preventing layer is preferably a dense sintered body having a thin plate-like shape composed of ceria. Specific examples of ceria include GDC (gadolinium-doped ceria), SDC (samarium-doped ceria), etc.

In the cell A of the SOFC having the temperature increased to the working temperature (e.g., 600 to 900° C.), the fuel gas (hydrogen gas) is supplied to the fuel channel 11 in the support member 10 through the opening 12, while a gas containing oxygen (air) is supplied to the air-side electrode 40, whereby a chemical reaction represented by the following Formulas (1) and (2) occurs. Thus, a potential difference is caused between the fuel-side electrode 20 and the air-side electrode 40.

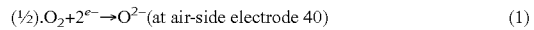

$$(½).O_2+2e^- \rightarrow O^{2-} \text{(at air-side electrode 40)} \quad (1)$$

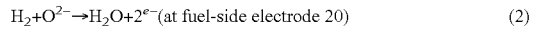

$$H_2+O^{2-} \rightarrow H_2O+2e^- \text{(at fuel-side electrode 20)} \quad (2)$$

In the cell A of the SOFC, a conductive connection member (referred to as an interconnector) for collecting electric current is generally bonded and fixed to the support member 10 and the respective air-side electrodes 40 and 40 by a bonding agent. Power based upon the potential difference is taken out to the outside through the interconnectors.

(Manufacturing Method of SOFC Cell)

Next, one example of a manufacturing method of the cell A of the SOFC illustrated in FIG. 1 will be described. In the description below, a "compact" means a state before the sintering. In order to indicate the "compact", "g" is attached at the end of a symbol indicating a sintered body that is obtained by sintering the "compact".

(Manufacture of Compact 10dg of Support-Member Divided-Member)

In the present embodiment, upon manufacturing the above-mentioned support member 10 (sintered body), the compact 10dg of the support-member divided-member, which has a shape formed by dividing the support member 10 into two in the thickness direction (Z-axis direction), in order to divide the fuel channel 11 into two in the thickness direction is formed. A channel pattern corresponding to the shape of the fuel channel 11 is formed on the surface corresponding to the fuel channel 11 on the support-member divided-member compact 10dg. Since two (a pair of) support-member divided-member compacts 10dg are bonded and sintered, the support member 10 is formed. The manufacture of the support-member divided-member compact 10dg will firstly be described below.

Figure 4:
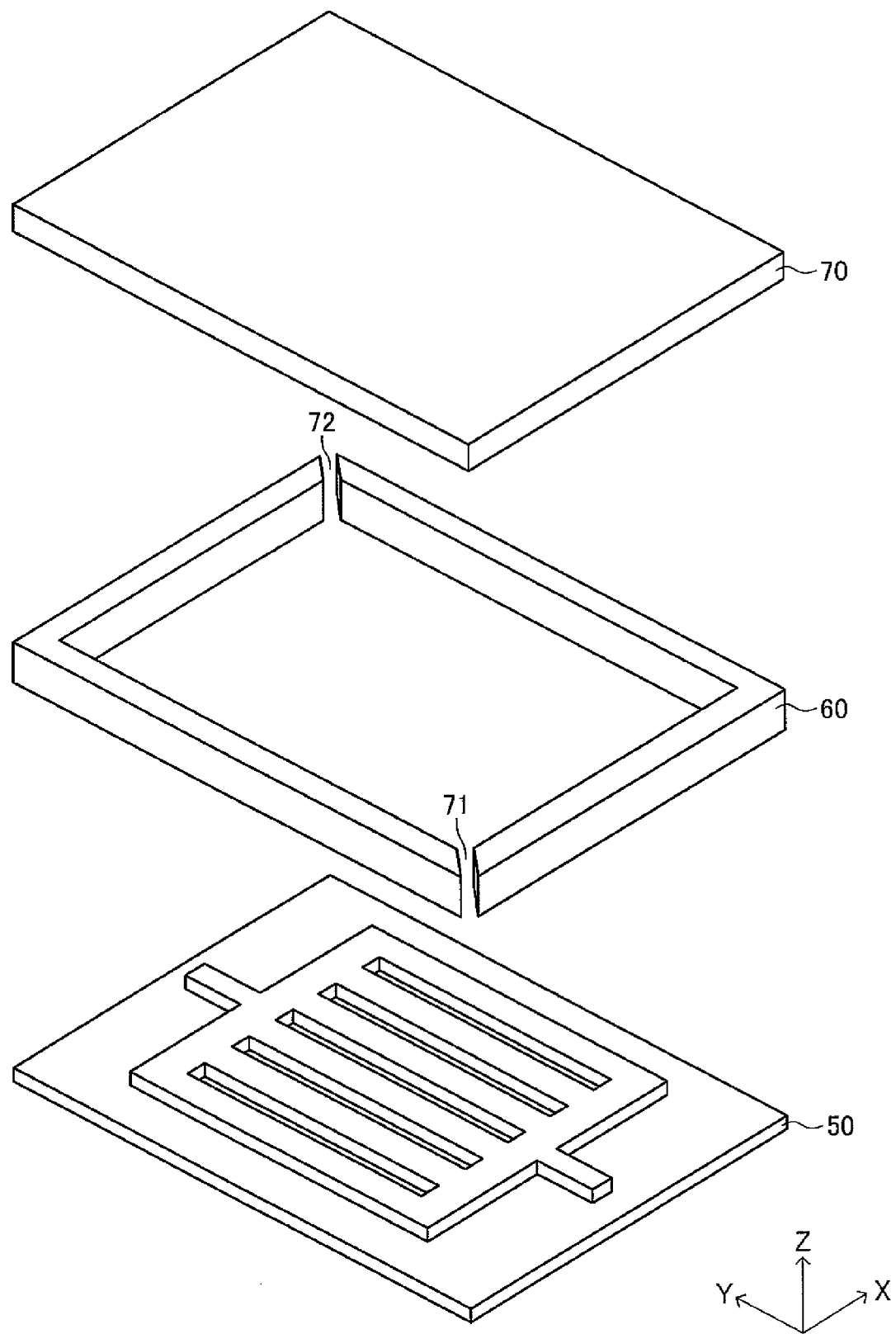
FIG. 4 is an exploded perspective view illustrating a molding die used for manufacturing a divided member of the support member illustrated in FIG. 1.
Figure 5:
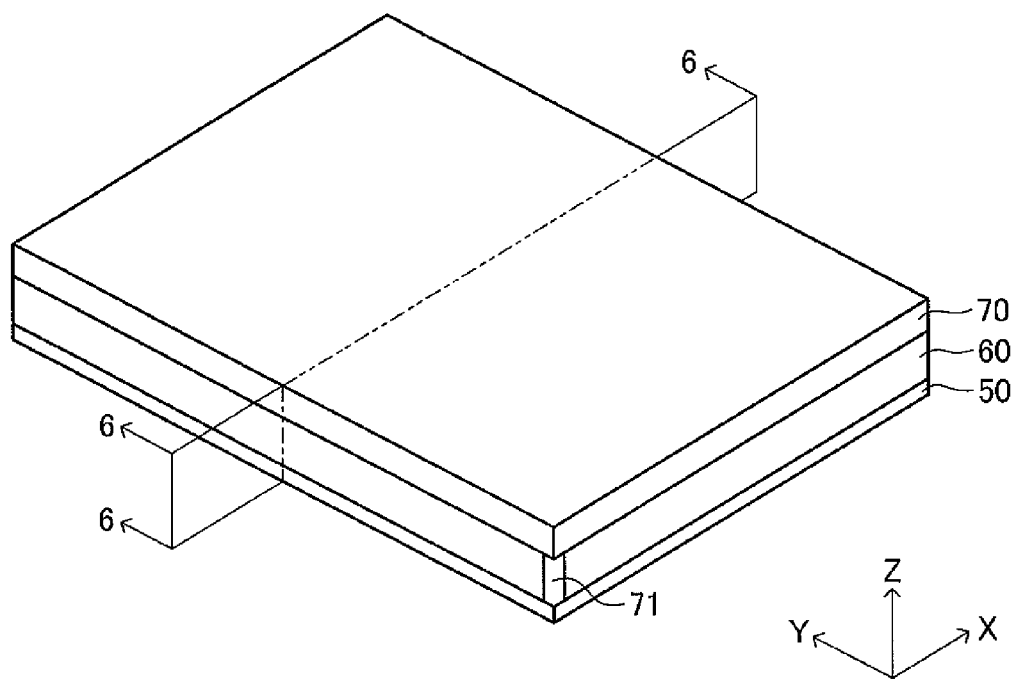
FIG. 5 is a perspective view illustrating the state in which the molding die illustrated in FIG. 4 is assembled.
Figure 6:
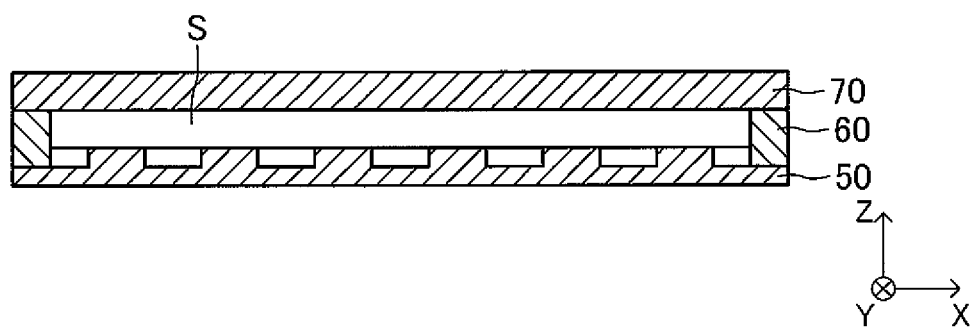
FIG. 6 is a sectional view illustrating a section obtained by cutting the molding die illustrated in FIG. 5 along a plane that includes 6-6 line and that is parallel to the X-Z plane.

The support-member divided-member compact 10dg is manufactured by the above-mentioned gel cast method. FIGS. 4 to 6 illustrate a molding die used for molding the support-member divided-member compact 10dg by the gel cast method. As illustrated in FIGS. 4 to 6, the molding die includes a lower die 50, a middle die 60, and an upper die 70. The pattern corresponding to the channel pattern is formed on the upper surface (molding surface) of the bottom wall of the lower die 50. A casting opening 71 for slurry casting and an air vent opening 72 for removal of air upon the slurry casting are respectively formed at two corners located on the diagonal line of the middle die 60. The casting opening 71 and the air vent opening 72 may be formed on the lower die 50, or on the upper die 70. Alternatively, the casting opening 71 may be formed on any one of the lower die 50, the middle die 60, and the upper die 70, while the air vent opening 72 may be formed on any one of the lower die 50, the middle die 60, and the upper die 70.

As illustrated in FIGS. 5 and 6, the lower die 50, the middle die 60, and the upper die 70 are stacked and fixed in this order from the bottom when the assembly is completed. In the state in which the assembly is completed, a molding space S that is defined by the upper surface (molding surface) of the bottom wall of the lower die 50, the inner surface (molding surface) of the side wall of the middle die 60, and the lower surface (molding surface) of the upper die 70 is formed in the molding diet. The shape of the molding space S corresponds to the outer shape of the support-member divided-member compact 10dg.

The support-member divided-member compact 10dg is manufactured by the gel cast method according to the procedure described below. Firstly, a predetermined mold release agent (the one formed by dispersing fluorine-based mold release agent with an organic solvent) is applied onto the respective molding surfaces (the surface with which the slurry is in contact) of the lower die 50, the middle die 60, and the upper die 70 with a spray, dip, brush, or the like. With this process, the residue of the compact is difficult to be deposited and left on the molding surface of the die when the die is removed from the compact (upon the mold release) as described later.

Then, the lower die 50, the middle die 60, and the upper die 70 are successively stacked and fixed as described above, whereby the assembly of the molding die is completed. After the middle die 60 is stacked on the lower die 50 (and before the upper die 70 is stacked onto the middle die 60), the above-mentioned mold release agent may be applied.

Next, a ceramic slurry is adjusted. The ceramic slurry contains metal powder, ceramic powder, dispersion media, and gelling agent. According to need, the ceramic slurry contains dispersion aid and catalyst. In the present embodiment, the ceramic slurry contains powder of NiO and powder of YSZ, constituting the support member 10, as the ceramic powder. The median size of the NiO particle constituting the NiO powder is 0.1 to 5.0 μm, and the median size of the YSZ particle constituting the YSZ powder is 0.1 to 5.0 μm.

In the present embodiment, the ceramic slurry containing and mixing 60 parts by weight of NiO powders as the NiO powder, 40.0 parts by weight of YSZ powders as the ceramic powder, 30.0 parts by weight of a mixture of aliphatic polyvalent ester and polybasic acid ester as the dispersion media and 0.5 part by weight of ethylene glycol, 4.0 parts by weight of 4,4'-diphenylmethane diisocyanate as the gelling agent, 3.0 parts by weight of copolymer of polycarboxylic acid as the dispersion aid, and 0.2 parts by weight of 6-dimethylamino-1-hexanol as the catalyst, is used.

An organic solvent such as aliphatic polyvalent ester, polybasic acid ester, toluene, xylene, or methyl ethyl ketone may be used as the dispersion media. As the gelling agent, phenolic resin, urethane resin, acrylic resin, or a precursor thereof may be used. An organic compound such as a copolymer of polycarboxylic acid, or sorbitan ester may be used as the dispersion aid. An amine compound such as 6-dimethylamino-1-hexanol may be used as the catalyst.

Figure 7:
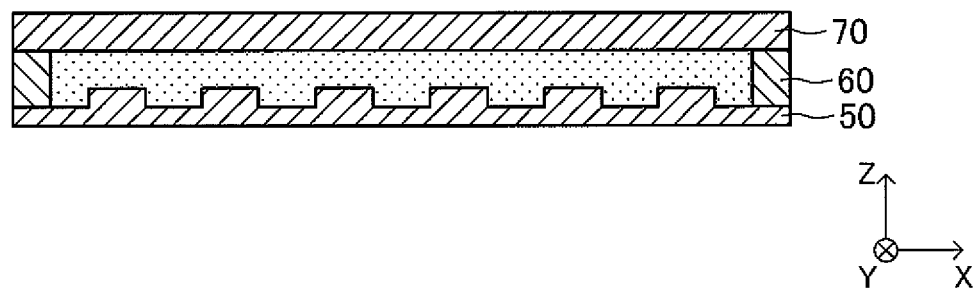
FIG. 7 is a sectional view corresponding to FIG. 6 and illustrating the state in which slurry is filled in a molding space of the molding die.

Next, the molding die that has been completed is exposed in atmospheric pressure, wherein the prepared ceramic slurry is injected into the molding space S through the casting opening 71 of the middle die 60. The injection of the ceramic slurry is started immediately after the preparation of the ceramic slurry. The injection of the ceramic slurry is continued until the slurry is raised in the air vent opening 72. Thus, the slurry is filled in the molding space S as illustrated in FIG. 7.

Then, the molding die having the ceramic slurry filled therein is left in a room-temperature environment for a predetermined time from the completion of the filling. During this period, the ceramic slurry is gradually hardened from sol, gel, and to a fragile solid mainly through a urethane reaction. The contraction of the slurry is hardly caused only by the urethane reaction. Further, with this state, the volatilization of the dispersion media from the slurry is hardly caused due to the presence of the upper die 70. Therefore, the contraction due to the volatilization of the dispersion media (i.e., due to the reduction in the number of molecules) is hardly caused.

Specifically, in this stage, the slurry is hardened, but the contraction of the slurry is hardly caused. In this stage, the heating may be performed within the range not more than a fusing temperature of the mold release agent, or a cooling may be performed. With this process, the urethane reaction further proceeds, whereby the slurry is easy to be hardened from the fragile solid described above to the solid having strength.

Figure 8:
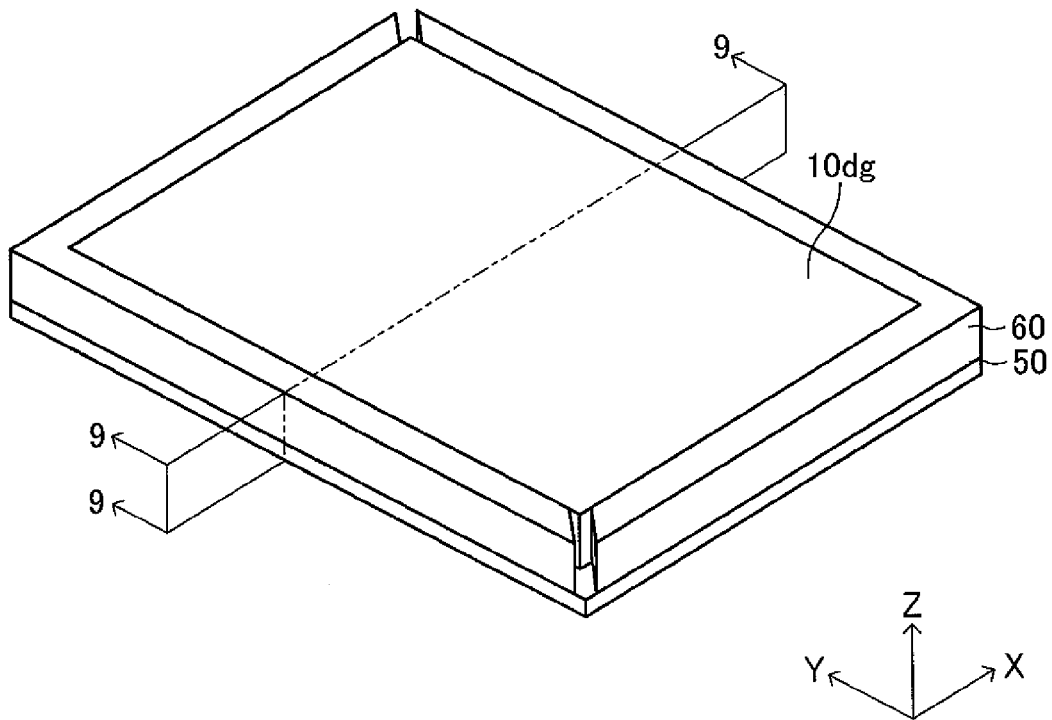
FIG. 8 is a perspective view illustrating the molding die in which the compact of the support-member divided-member that is molded and hardened remains, and an upper die is removed.
Figure 9:
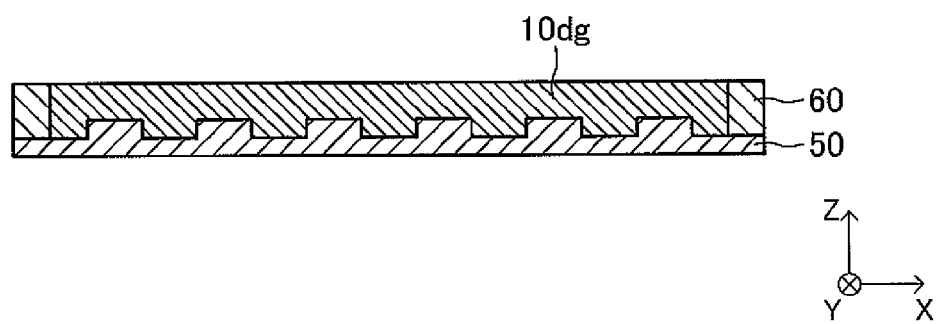
FIG. 9 is a sectional view illustrating a section obtained by cutting the molding die illustrated in FIG. 8 along a plane that includes 9-9 line and that is parallel to the X-Z plane.

As described above, the support-member divided-member compact 10dg (before the drying) is formed in the molding die as illustrated in FIGS. 8 and 9. FIGS. 8 and 9 illustrate the state in which the upper die 70 is removed, i.e., the state in which the upper surface of the support-member divided-member compact 10dg is exposed and the support-member divided-member compact 10dg is accommodated into the molding die (specifically, the lower die 50 and the middle die 60). As illustrated in FIGS. 8 and 9, the upper surface of the support-member divided-member compact 10dg is flattened, and the channel pattern corresponding to the shape of the fuel channel 11 is formed on the lower surface thereof.

Figure 10:
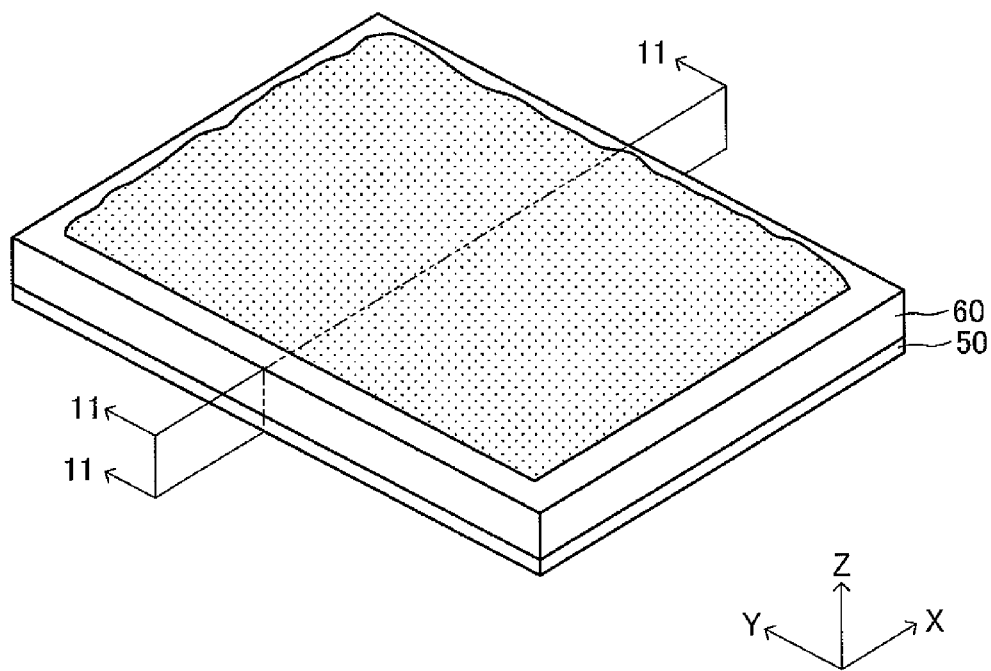
FIG. 10 is a perspective view illustrating the molding die into which the slurry is injected with the upper die being removed therefrom.
Figure 11:
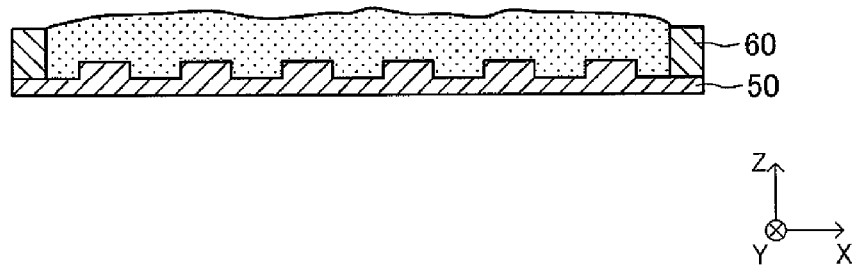
FIG. 11 is a sectional view illustrating a section obtained by cutting the molding die illustrated in FIG. 10 along a plane that includes 11-11 line and that is parallel to the X-Z plane.

The support-member divided-member compact 10dg (before the drying) that is in the state illustrated in FIGS. 8 and 9 can also be manufactured according to the procedure illustrated in FIGS. 10 to 13. Specifically, as illustrated in FIGS. 10 and 11, only the lower die 50 and the middle die 60 are stacked and fixed, and with this state, the ceramic slurry is injected in the molding die. The injection is continued until the slurry slightly swells from the upper surface of the middle die 60.

Figure 12:
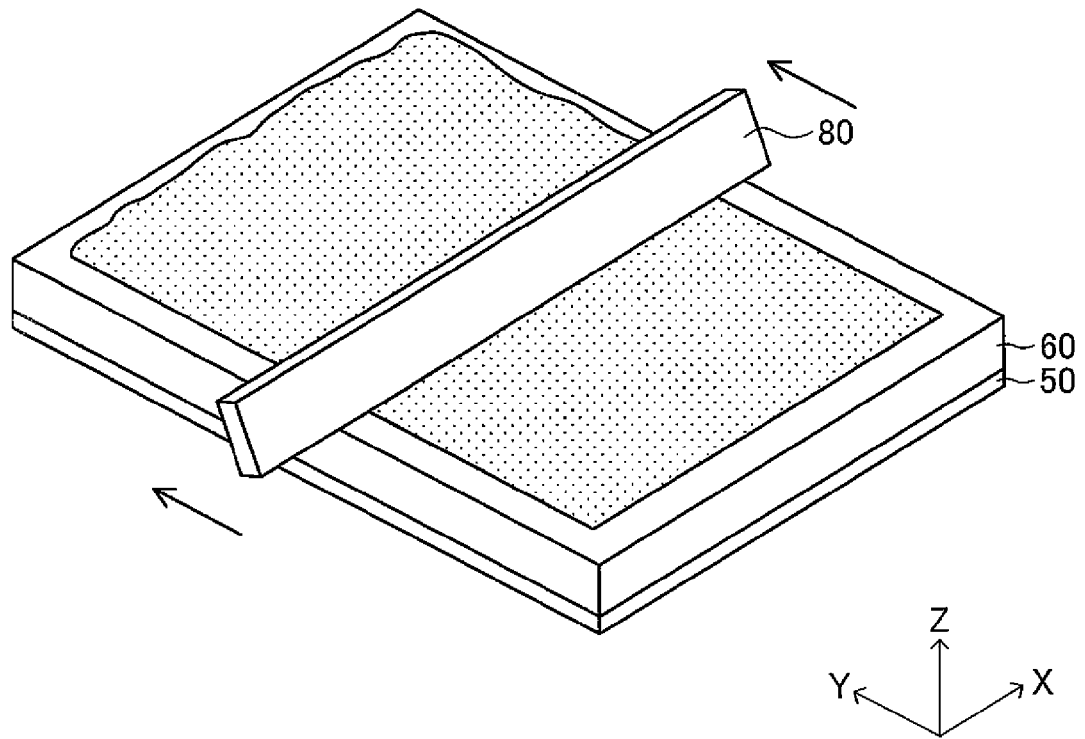
FIG. 12 is a perspective view illustrating the state in which the molding die illustrated in FIG. 10 is subject to a squeegeeing by a squeegee along the upper surface of the molding die.
Figure 13:
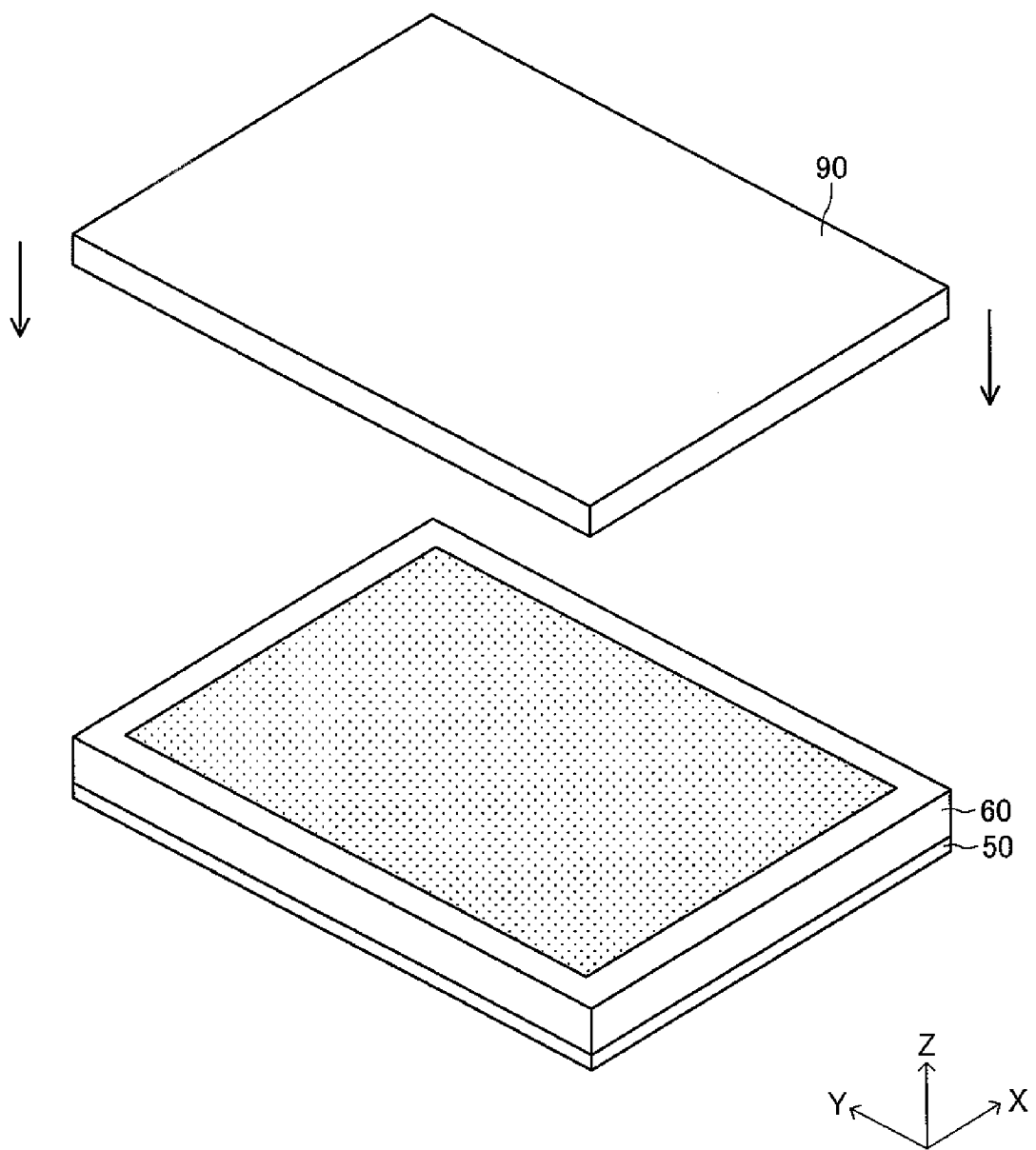
FIG. 13 is a perspective view illustrating the state in which the upper surface of the molding die is covered by a cover after the squeegeeing illustrated in FIG. 12.

Next, a squeegee 80 is moved along the upper surface of the middle die 60 (squeegeeing) as illustrated in FIG. 12, whereby the slurry that slightly swells from the upper surface of the middle die 60 is removed. Then, as illustrated in FIG. 13, a cover member 90 is placed onto the upper surface of the middle die 60, and the molding die is left in this state for a predetermined time. Since the cover member 90 is placed, the volatilization of the dispersion media from the slurry is prevented. Thereafter, the cover member 90 is removed, whereby the support-member divided-member compact 10*dg* (before the drying) illustrated in FIGS. 8 and 9 can be formed. Alternatively, after the squeegeeing, the molding die may be left without placing the cover member 90. The manufacture of the support-member divided-member compact 10*dg* (before the drying) has been described above.

(Formation of Fuel-Side Electrode Compact 20*g*)

Next, with the state illustrated in FIGS. 8 and 9, i.e., with the state in which the upper surface of the support-member divided-member compact 10*dg* is exposed, and the support-member divided-member compact 10*dg* is accommodated in the molding die (specifically, the lower die 50 and the middle die 60), a fuel-side electrode compact 20*g* is formed on the upper surface of the support-member divided-member compact 10*dg*.

The fuel-side electrode compact 20*g* may be formed on the upper surface of the support-member divided-member compact 10*dg* in the state in which the molding die (specifically, the lower die 50 and the middle die 60) is removed from the support-member divided-member compact 10*dg*, and the support-member divided-member compact 10*dg* is accommodated so as to be fitted in a die (fitting type) that is different from the molding die having the pattern corresponding to the channel pattern formed on its bottom wall. In the description below, the molding die and the fitting-type die are collectively referred to as "die".

The compact 20*g* is formed with a screen printing method, for example. In this case, slurry used in the screen printing can be prepared by adding binder, dispersion agent, plasticizer, and dispersion media to the mixture of NiO powder and YSZ powder, according to need. The compact 20*g* may be formed by a tape stacking method.

After the fuel-side electrode compact 20*g* is formed on the upper surface of the support-member divided-member compact 10*dg*, the compact 20*g* is sometimes pressed from above in the thickness direction in order to prevent the peeling of the compact 20*g* (e.g., in the case of the tape stacking method). Upon the pressing, the whole region of the lower surface (i.e., the irregular surface on which the cannel pattern is formed) of the support-member divided-member compact 10*dg* is in contact with the bottom wall (i.e., the surface on which the pattern corresponding to the channel pattern is formed, the irregular surface) of the die. Thus, the stacked compact composed of the support-member divided-member compact 10*dg* and the fuel-side electrode compact 20*g* is not warped.

(Formation of Electrolyte Compact 30*g*)

Figure 14:
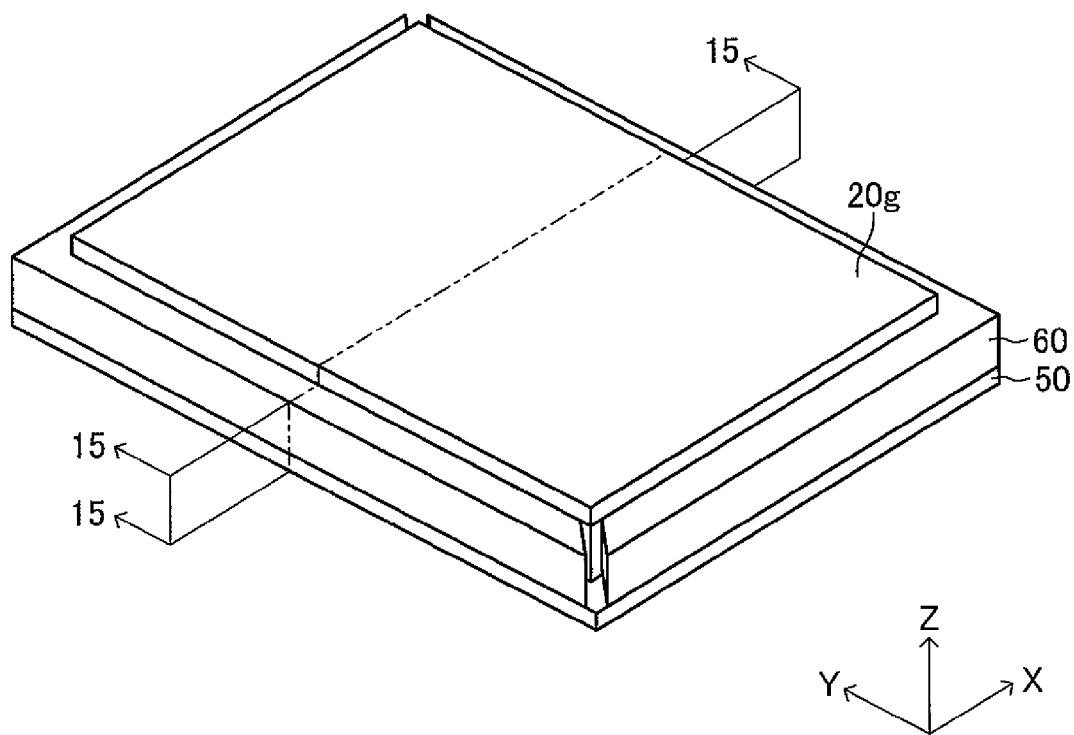
FIG. 14 is a perspective view illustrating the molding die in which a compact of a fuel-side electrode is formed on the compact of the support-member divided-member illustrated in FIG. 8.
Figure 15:
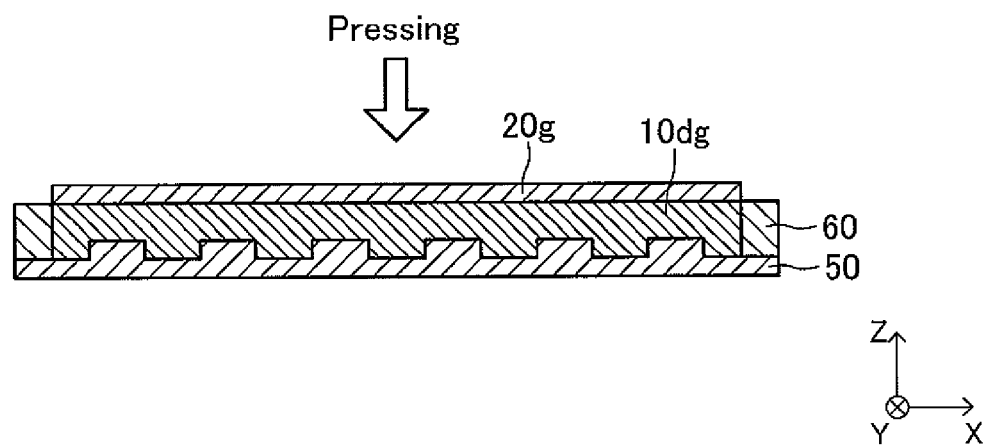
FIG. 15 is a sectional view illustrating a section obtained by cutting the molding die illustrated in FIG. 14 along a plane that includes 15-15 line and that is parallel to the X-Z plane.
Figure 16:
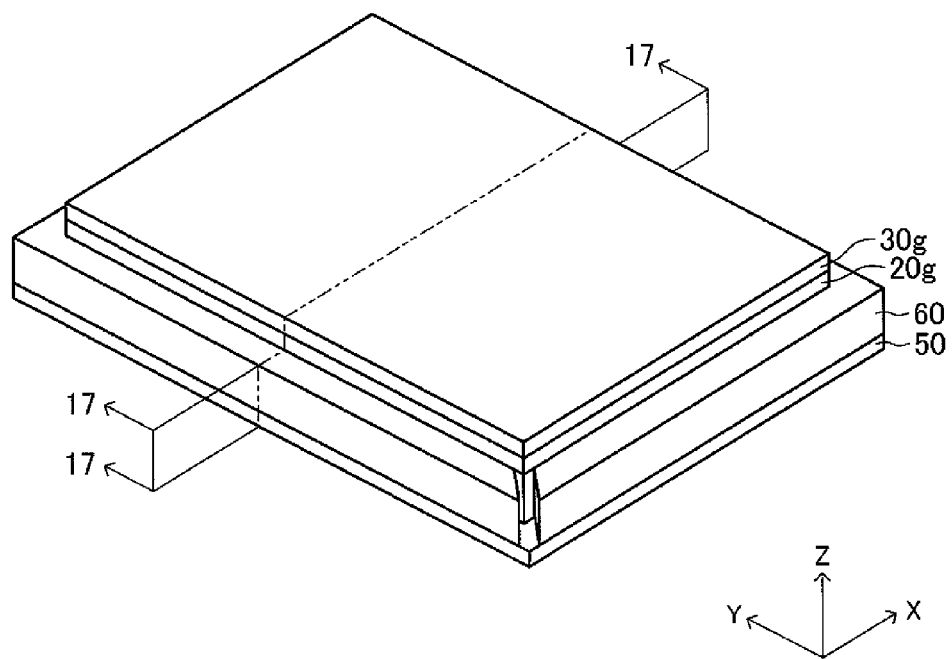
FIG. 16 is a perspective view illustrating the molding die in which a compact of a solid electrolyte is formed on the compact of the fuel-side electrode illustrated in FIG. 14.
Figure 17:
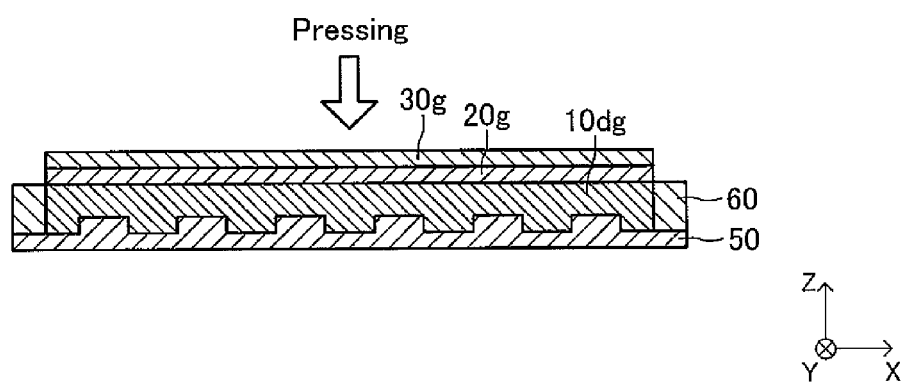
FIG. 17 is a sectional view illustrating a section obtained by cutting the molding die illustrated in FIG. 16 along a plane that includes 17-17 line and that is parallel to the X-Z plane.

Next, with the state illustrated in FIGS. 14 and 15, i.e., with the state in which the upper surface of the fuel-side electrode compact 20*g* is exposed, and the support-member divided-member compact 10*dg* is accommodated in the die, an electrolyte compact 30*g* is formed on the upper surface of the compact 20*g* as illustrated in FIGS. 16 and 17.

The compact 30*g* is formed with a screen printing method, for example. In this case, slurry used in the screen printing can be prepared by adding binder, dispersion agent, plasticizer, and dispersion media to the YSZ powder, according to need. The compact 30*g* may be formed by a tape stacking method.

After the electrolyte compact 30*g* is formed on the upper surface of the fuel-side electrode compact 20*g*, the compact 30*g* is sometimes pressed from above in the thickness direction in order to prevent the peeling of the compact 30*g* (e.g., in the case of the tape stacking method). Even in this case, the stacked compact composed of the support-member divided-member compact 10*dg*, the fuel-side electrode compact 20*g*, and the electrolyte compact 30*g* is not warped by the reason described above.

In the embodiment described above, the fuel-side electrode compact 20*g* is formed on the support-member divided-member compact 10*dg*, and then, the electrolyte compact 30*g* is formed on the fuel-side electrode compact 20*g*. On the other hand, a stacked body including the fuel-side electrode compact 20*g* and the electrolyte compact 30*g* may be formed, and then, the stacked body may be formed on the support-member divided-member compact 10*dg*.

(Mold Release)

Figure 18:
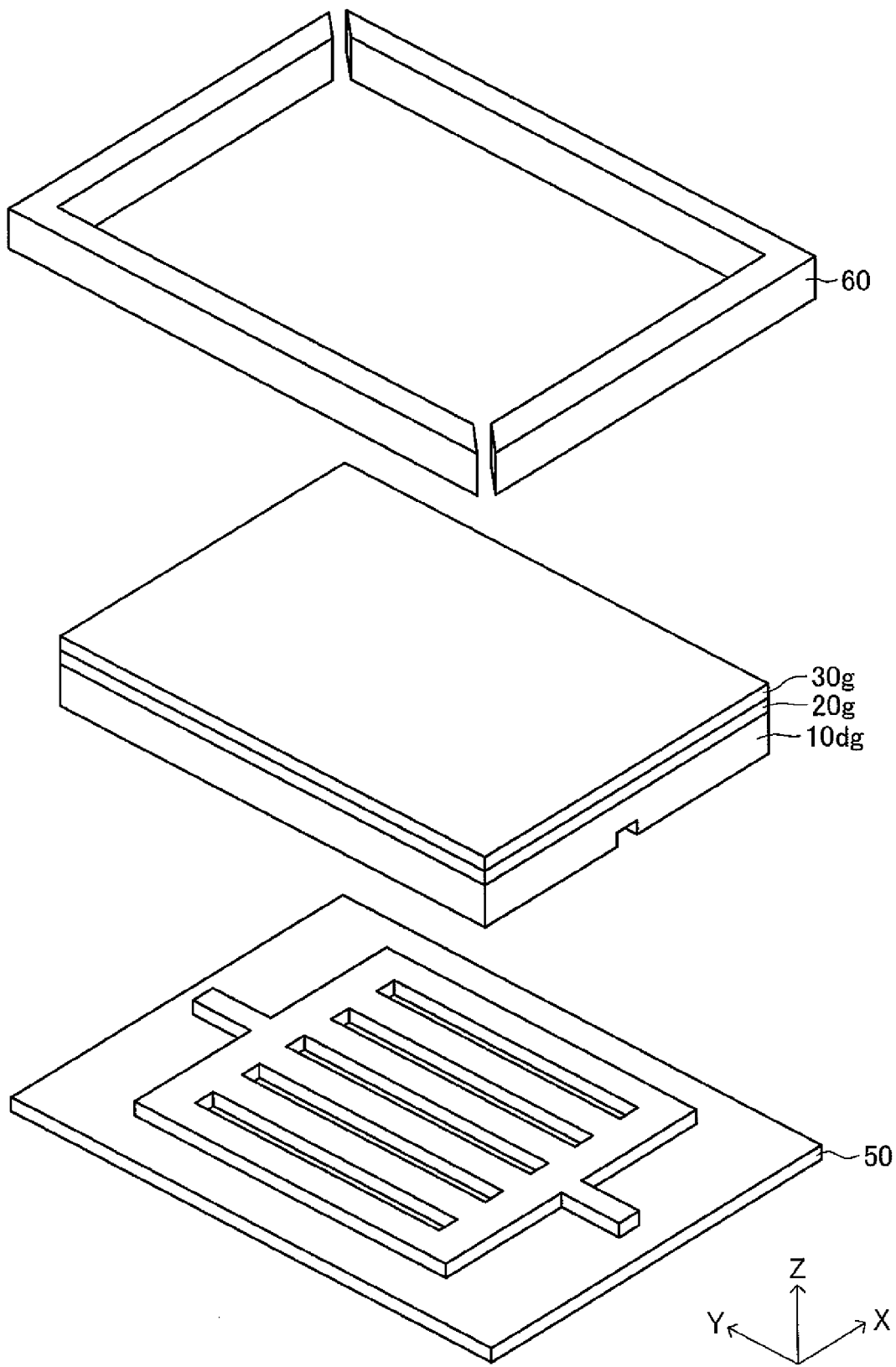
FIG. 18 is a perspective view illustrating the state in which the molding die is removed from the compact of the cell divided member.

Then, as illustrated in FIG. 18, the die is removed from the stacked compact including the support-member divided-member compact 10*dg*, the fuel-side electrode compact 20*g*, and the electrolyte compact 30*g*.

(Drying, and Completion of Cell Divided-Member Compact Bdg)

Next, the stacked compact including the support-member divided-member compact 10*dg*, the fuel-side electrode compact 20*g*, and the electrolyte compact 30*g* is dried, in an isolated state, in an atmosphere having a predetermined high temperature caused by the application of heat for a predetermined time. Alternatively, it may be left and dried in a room-temperature atmosphere for a predetermined time. With this state, the stacked compact is hardened mainly through the urethane reaction. Since the upper portion of the stacked compact is exposed to the outside, the drying and contraction of the stacked compact progresses because of the volatilization of the dispersion media (i.e., because of the reduction in the number of molecules).

As described above, the stacked compact is contracted because of the volatilization of the dispersion media (i.e., because of the reduction in the number of molecules). Specifically, in this stage, the stacked compact is positively contracted, and the stacked compact is further hardened.

Figure 19:
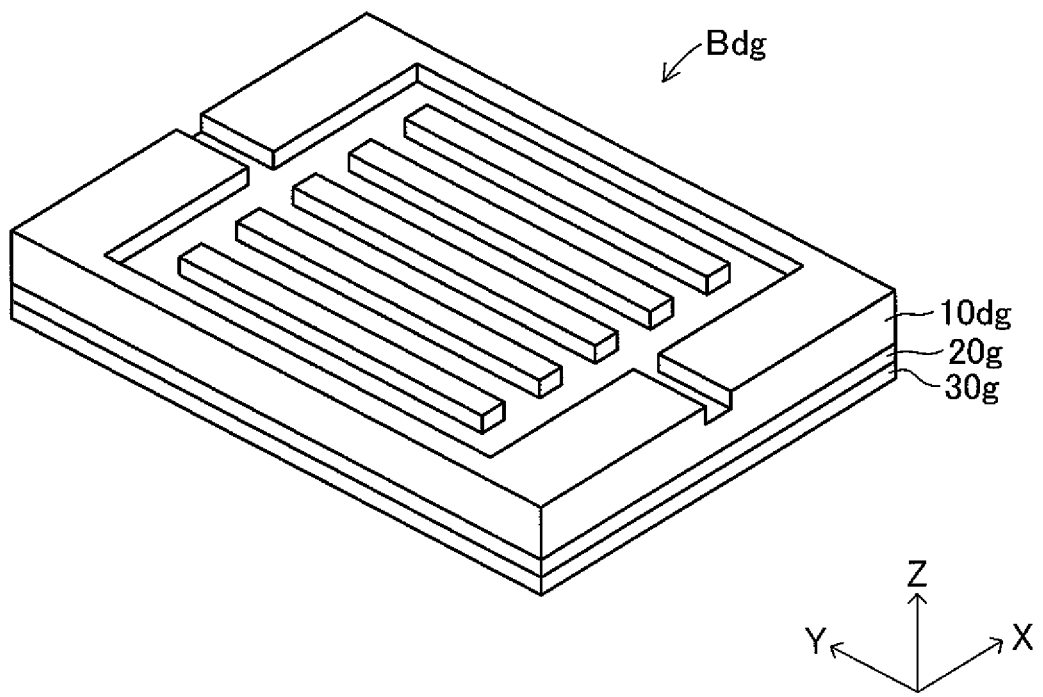
FIG. 19 is a perspective view illustrating the completed compact of the cell divided member.

According to the process described above, as illustrated in FIG. 19, the compact Bdg (after drying) of a divided member Bd of an SOFC cell B, from which the oxygen-side electrodes 40 and 40 are not formed, in the SOFC cell A (see FIG. 1) can be produced in an isolated state.

In the embodiment described above, after the fuel-side electrode compact 20*g* and the electrolyte compact 30*g* are formed on the support-member divided-member compact 10*dg*, the stacked compact including the compact 10*dg*, the compact 20*g*, and the compact 30*g* is simultaneously subject to the drying process. On the other hand, only the support-member divided-member compact 10*dg* may be subject to the drying process in the isolated state, and then, the stacked compact including the compact 10*dg*, the compact 20*g*, and the compact 30*g* may be simultaneously subject to the drying process.

In this case, in the state illustrated in FIGS. 8 and 9, the molding die (specifically, the lower die 50 and the middle die 80) is firstly removed from the support-member divided-member compact 10*dg* (before the drying). Then, the support-member divided-member compact 10*dg* (before the drying) is dried in an atmosphere having a predetermined high temperature caused by the application of heat for a predetermined time. Alternatively, it may be left and dried in a room-temperature atmosphere for a predetermined time. With this process, the compact 10*dg* is contracted, and further hardened because of the volatilization of the dispersion media (i.e., because of the reduction in the number of molecules). Consequently, the contracted support-member divided-member compact 10*dg* (after the drying) can be obtained.

Then, the support-member divided-member compact 10*dg* (after the drying) is accommodated in a die, which has a similar shape smaller than the molding die (the lower die 50+middle die 60) by the contracted amount of the support-member divided-member compact 10*dg*. Thus, the state similar to that illustrated in FIGS. 8 and 9, i.e., the state in which the upper surface of the support-member divided-member compact 10*dg* (after the drying) is exposed, and the support-member divided-member compact 10*dg* (after the drying) is accommodated in the die (specifically, the above-mentioned slightly smaller lower die and the middle die), can be formed. Thereafter, the process same as described above is executed, whereby the cell divided-member compact Bdg (after the drying) described above can be formed in an isolated state.

(Bonding of Cell Divided-Member Compact Bdg)

Figure 20:
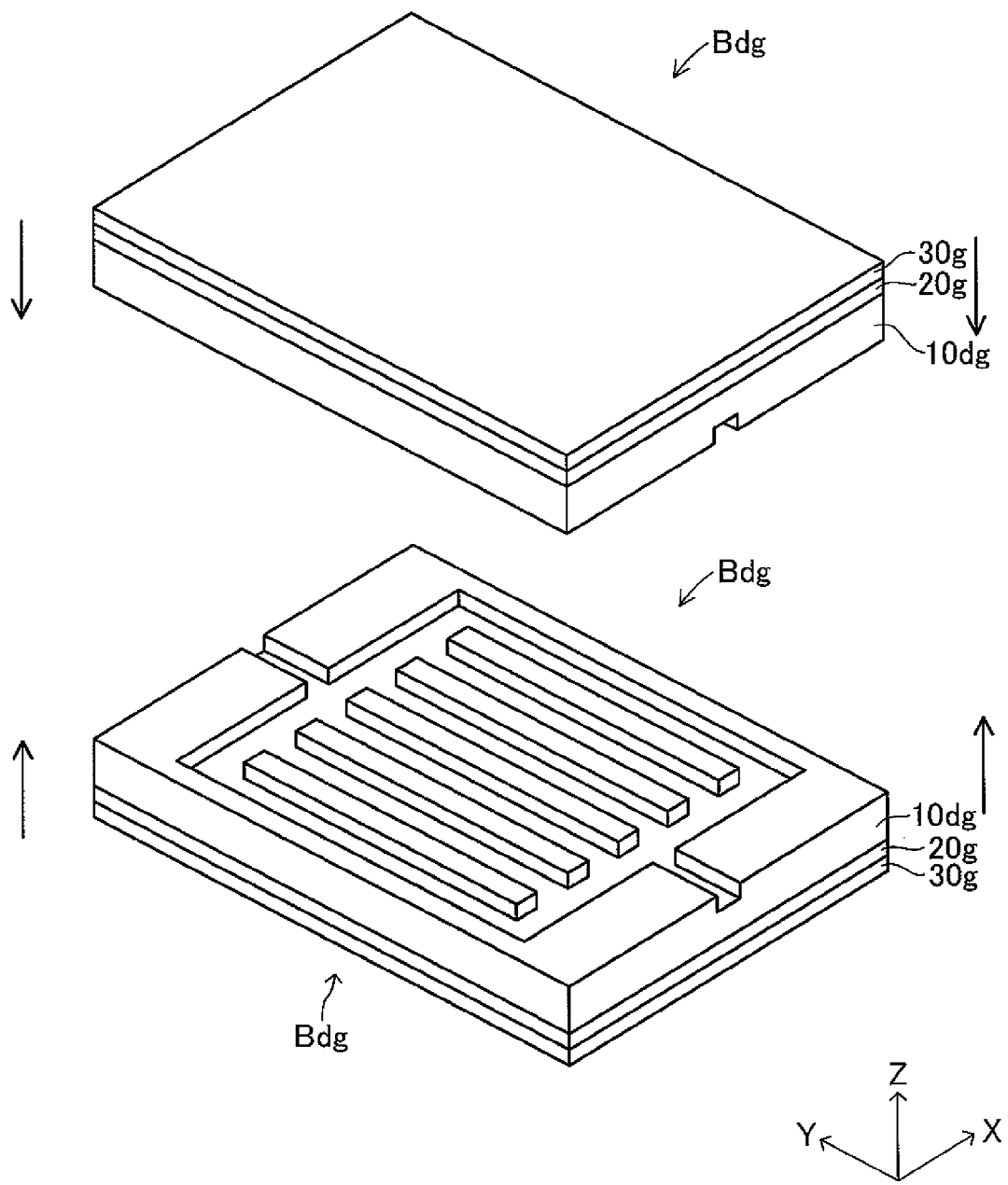
FIG. 20 is a perspective view illustrating the state in which two compacts of the cell divided member are bonded to each other.
Figure 21:
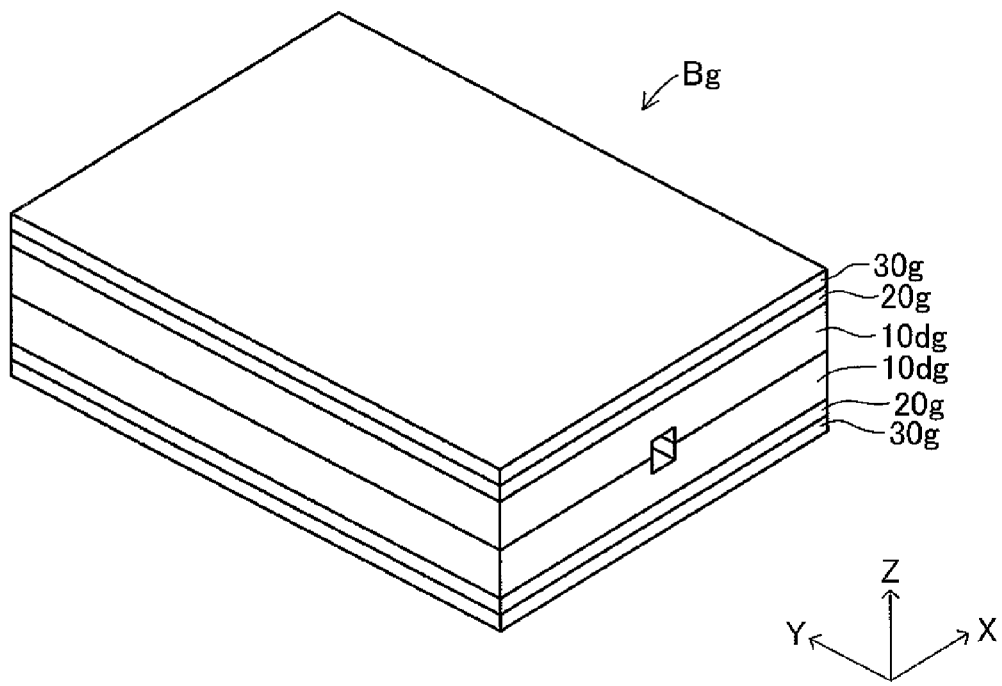
FIG. 21 is a perspective view illustrating a bonded stacked body, before the sintering, formed by bonding two compacts of the cell divided member.

Two cell divided-member compacts Bdg manufactured as described above are prepared. A predetermined bonding agent is applied on the surface, on which the channel pattern is formed, of the support-member divided-member compact 10*dg* in each of the cell divided-member compacts Bdg. The bonding agent may be applied only one of the two cell divided-member compacts Bdg. As illustrated in FIG. 20, the surfaces where the bonding agent is applied (i.e., the surfaces on which the channel pattern is formed) of the two cell divided-member compacts Bdg are bonded to each other. Thus, the cell bonded compact Bg having the fuel channel 11 formed therein is formed as illustrated in FIG. 21.

(Sintering of Cell Bonded Compact Bg)

Figure 22:
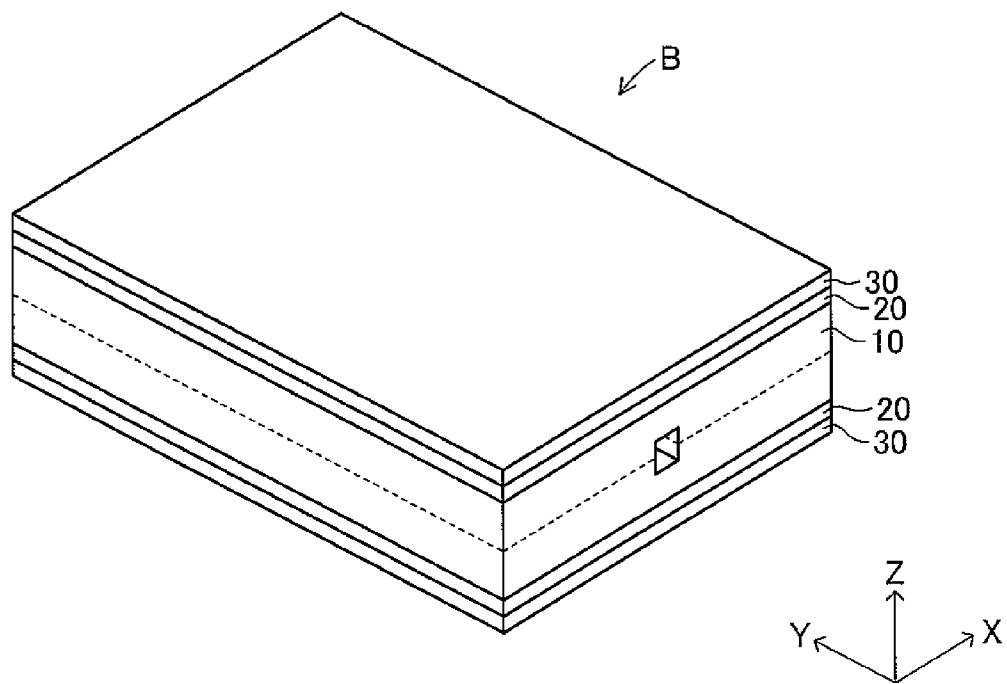
FIG. 22 is a perspective view illustrating the bonded stacked body, after the sintering, formed by sintering the bonded stacked body illustrated in FIG. 21.

Then, the cell bonded compact Bg is subject to a sintering process. The sintering condition is such that the highest temperature of 1350° C.×1 hour, for example. With this process, the compacts 10*dg*, 10*dg*, the compacts 20*g*, 20*g*, and the compacts 30*g*, 30*g*, which constitute the cell bonded compact Bg, are all sintered. As illustrated in FIG. 22, the SOFC cell B (i.e., the sintered body in which the oxygen-side electrodes 40, 40 are not formed in the SOFC cell A) composed of the support member 10, the fuel-side electrodes 20, 20 and the electrolytes 30, 30 can be formed.

In the embodiment described above, the cell bonded compact Bg is sintered after the two cell divided-member compacts Bdg are bonded. However, the two cell divided members Bd may be bonded after the cell divided-member compacts Bdg are sintered.

(Formation of Oxygen-Side Electrode Compacts 40*g*, 40*g*)

Figure 23:
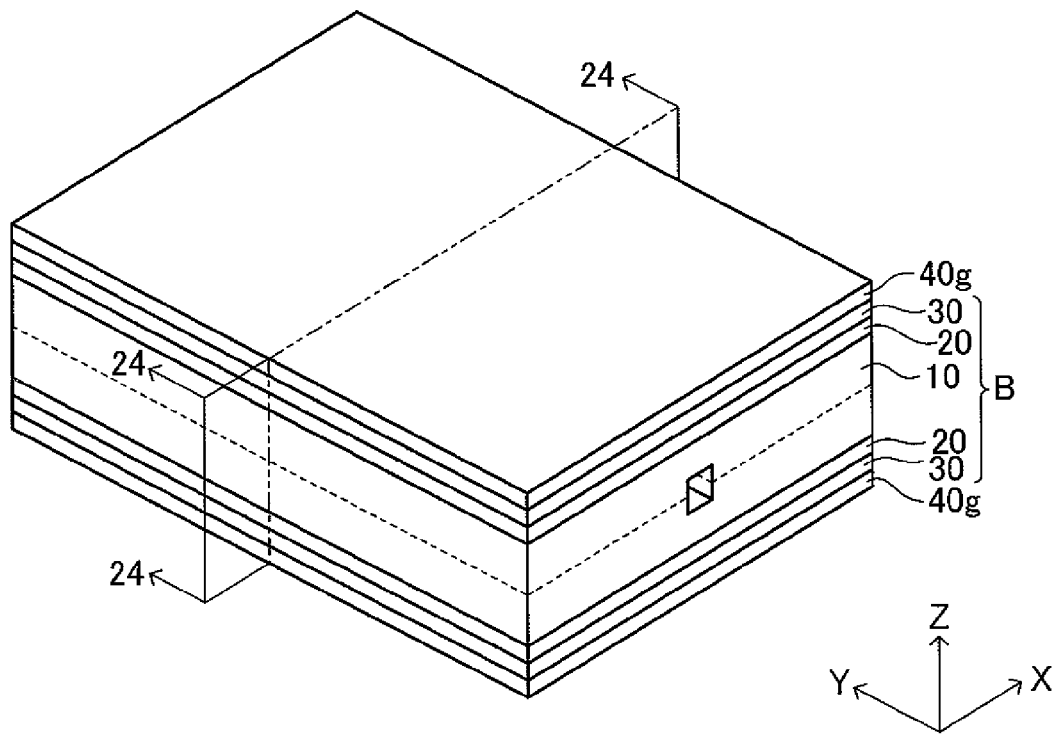
FIG. 23 is a perspective view illustrating a stacked body in which a compact of an oxygen-side electrode is formed respectively on the upper and lower surfaces of the sintered bonded stacked body illustrated in FIG. 22.
Figure 24:
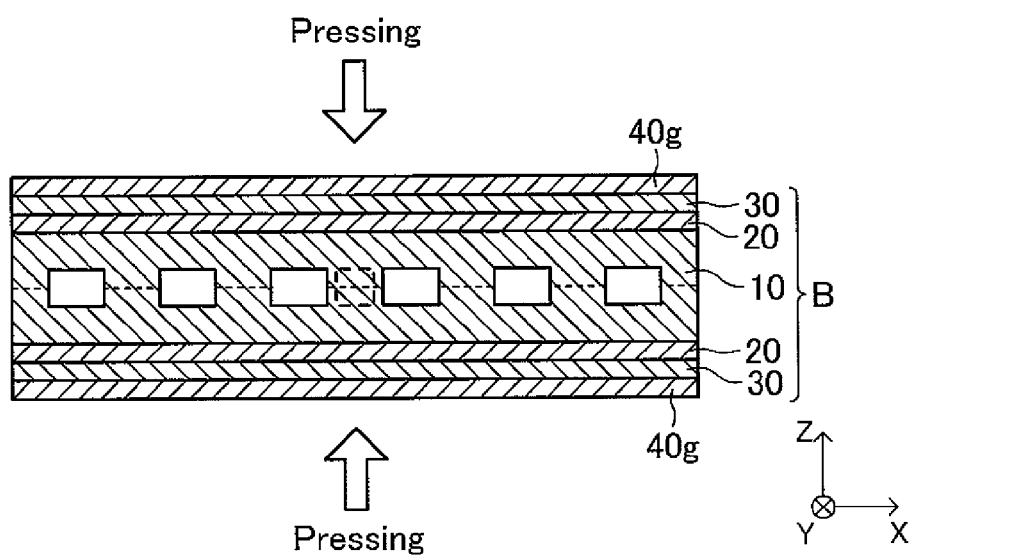
FIG. 24 is a sectional view illustrating a section obtained by cutting the stacked body illustrated in FIG. 23 along a plane that includes 24-24 line and that is parallel to the X-Z plane.

Next, as illustrated in FIGS. 23 and 24, compacts 40*g* of the oxygen-side electrode are formed respectively on the upper and lower surfaces (i.e., on the upper surface of the upper electrolyte 30 and the lower surface of the lower electrolyte 30) of the SOFC cell B (sintered body). The compacts 40*g*, 40*g* are formed with a screen printing method, for example. In this case, slurry used in the screen printing can be prepared by adding binder, dispersion agent, plasticizer, and dispersion media to the electrode powder, according to need. LSCF, LSC, and Pt can be used as the electrode powder. The compacts 40*g*, 40*g* may be formed by a tape stacking method.

After the oxygen-side electrode compacts 40*g*, 40*g* are formed on the SOFC cell B, the upper compact 40*g* is sometimes pressed from above in the thickness direction in order to prevent the peeling of the compacts 40*g*, 40*g*. However, the cell B has already been sintered, so that it is rigid. Therefore, the cell B is not warped.

(Sintering of Oxygen-Side Electrode Compact 40*g*, and Completion of SOFC Cell A)

Next, the SOFC cell B having the oxygen-side electrode compacts 40*g*, 40*g* formed thereon is subject to the sintering process. The sintering condition is such that the highest temperature of 1000° C.×1 hour, for example. With this process, the compacts 40*g*, 40*g* are sintered, whereby the oxygen-side electrodes 40 and 40 are formed on the upper and lower surfaces of the SOFC cell B. Thus, the SOFC cell A illustrated in FIGS. 1 to 3 is completed.

The reason why only the compact 40*g* among the compacts 10*dg*, 20*g*, 30*g*, and 40*g* is sintered afterward is based upon the fact that the sintering temperature (1000° C.) of the compact 40*g* is lower than the sintering temperature (1350° C.) of the compacts 10*dg*, 20*g*, and 30*g*.

The sintering process is all executed in an oxidizing atmosphere. The support member 10 and the fuel-side electrode 20 are required to have conductivity. Therefore, a heat treatment of feeding reduction gas is performed to the support member 10 and the fuel-side electrode 20, which have already been sintered, in a high-temperature through the application of heat. With this heat treatment, NiO is reduced to Ni. One example of the manufacturing method of the SOFC cell A illustrated in FIGS. 1 to 3 has been described above.

(Operation and Effect)

In the manufacturing method of the SOFC cell A according to the embodiment of the present invention described above, the support-member divided-member compact 10*dg* is formed by using the gel cast method. As a result, in the support member (sintered body) obtained by bonding and sintering two divided-member compacts 10*dg*, the median size of a particle (primary particle) of Ni and/or NiO constituting the support member 10 is 0.1 to 5.0 μm, and the median size of the particle (=primary particle) of the YSZ constituting the support member 10 is 0.1 to 5.0 μm. On the other hand, as described in the background art, when the support-member divided-member compact is formed by a press molding using powder of a raw material, the diameter of the particle (=secondary particle) constituting the support member (sintered body), which is formed by sintering the compact, is relatively large, such as about 80 μm, in general.

Specifically, when the support-member divided-member compact is manufactured with the use of the gel cast method as in the embodiment of the present invention, the diameter of the particle constituting the support member (sintered body) can be made sufficiently small, compared to the case in which the support-member divided-member compact is manufactured by a press molding using powder of a raw material. Accordingly, when the manufacturing method according to the present invention is employed, the number of contacts between the support member 10 and the fuel-side electrode 20 is increased, compared to the case in which the technique described in the background art is employed, whereby a greater contact area can be secured on the interface. Accordingly, the electrical connection between both of them is easy to be secured. As a result, the electric resistance (ohmic resistance) as the whole SOFC cell is more reduced, with the result that the output density as the whole SOFC can further be increased. Additionally, the degree of freedom in designing the shape of the fuel channel in the support member is increased, so that the output density of the cell is increased.

Further, in the embodiment according to the present invention, the fuel-side electrode compact 20*g* and the electrolyte compact 30*g* are formed on the upper surface of the support-member divided-member compact 10*dg* in the state in which the support-member divided-member compact 10*dg* is accommodated in the die (see FIGS. 8 and 9). Accordingly, even if the respective compacts are pressed from above in the thickness direction of the support-member divided-member compact 10*dg* in order to prevent the peeling of the respective compacts upon the formation of the respective compacts on the support-member divided-member compact 10*dg*, the whole region of the lower surface (i.e., the irregular surface on which the channel pattern is formed) of the support-member divided-member compact 10*dg* is in contact with the bottom wall (i.e., the surface on which the pattern corresponding to the channel pattern is formed, the irregular surface) of the die. Therefore, the support-member divided-member compact 10*dg* cannot be warped. Consequently, the degree of freedom in designing the internal channel of the support member is enhanced.

When the SOFC cell A is manufactured by using the SOFC cell divided-member compact Bdg formed by the manufacturing method of the present invention, the SOFC cell (sintered body) having the gas channel formed in the support member 10 can be manufactured, wherein the electric resistance of the whole cell is relatively small, and the warpage is difficult to be caused on the support member 10.

Figure 25:
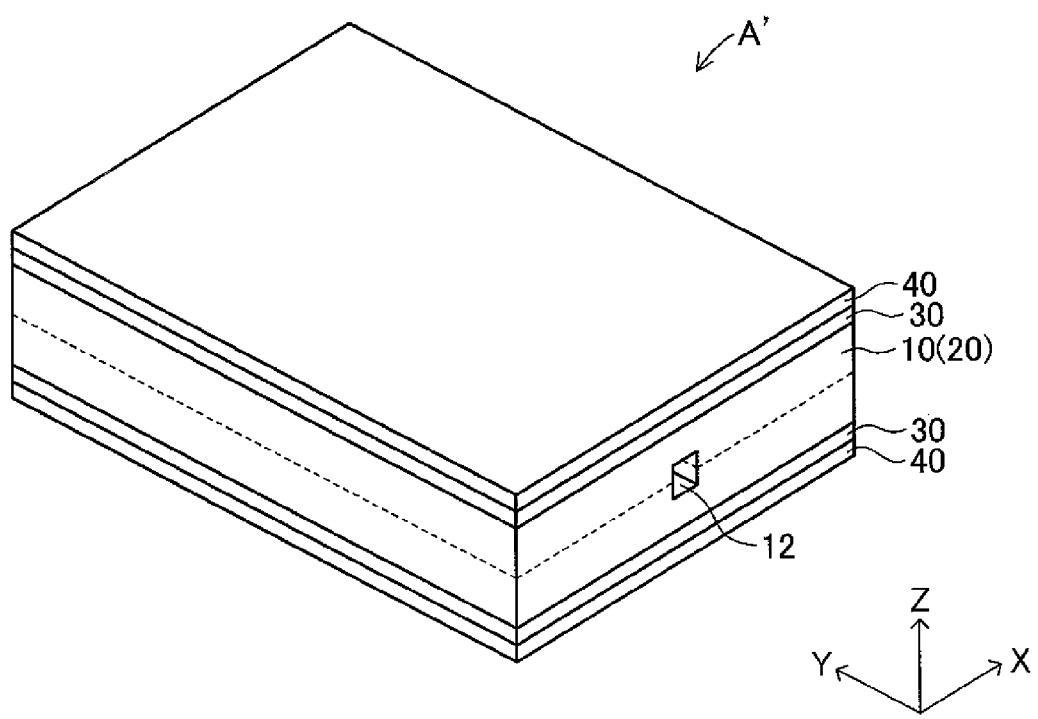
FIG. 25 is a perspective view illustrating an SOFC cell manufactured by the manufacturing method of an SOFC cell according to a modification of the present invention, when the support member also functions as the fuel-side electrode.

In the SOFC cell A described above, the fuel-side electrodes 20, 20 (=fuel electrode active layer) are interposed between the support member 10 (=fuel electrode current-collecting layer) and the electrolytes 30, 30. However, when the support member 10 also serves as the fuel electrode 20, the fuel-side electrode may be removed as in an SOFC cell A' illustrated in FIG. 25. In this case, the process involved with the "formation of the fuel-side electrode compact 20*g*" (see FIGS. 14 and 15) is skipped during the manufacturing process of the cell divided-member compact Bdg.

Figure 26:
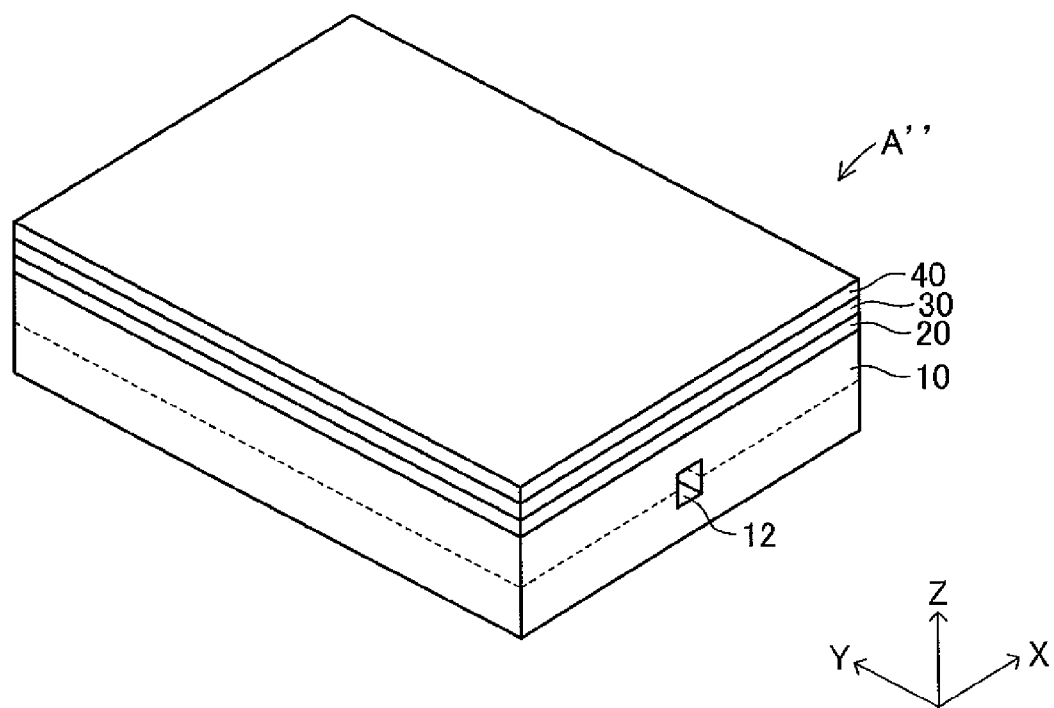
FIG. 26 is a perspective view illustrating an SOFC cell manufactured by the manufacturing method of an SOFC cell according to a modification of the present invention, when the fuel-side electrode is formed only on one of the upper and lower surfaces of the support member.

In the SOFC cell A described above, the fuel-side electrodes 20, the electrolytes 30, and the oxygen-side electrodes 40 are stacked on the upper and lower surfaces of the support member 10 respectively. However, the fuel-side electrode 20, the electrolyte 30, and the oxygen-side electrode 40 may be stacked only one of the upper and lower surfaces of the support member 10 as in an SOFC cell A" illustrated in FIG. 26. In this case, instead of bonding and sintering (or sintering and bonding) the two cell divided-member compacts Bdg, a single cell divided-member compact Bdg and a single support-member divided-member compact 10*dg* are bonded and sintered (or sintered and bonded). Thereafter, a single oxygen-side electrode compact 40*g* is formed on a single electrolyte 30 in the sintered body, and then, the single oxygen-side electrode compact 40*g* is sintered, whereby the SOFC cell A" illustrated in FIG. 26 is formed. Even in this case, the fuel-side electrode can be removed as in the above-mentioned case.

Figure 27:
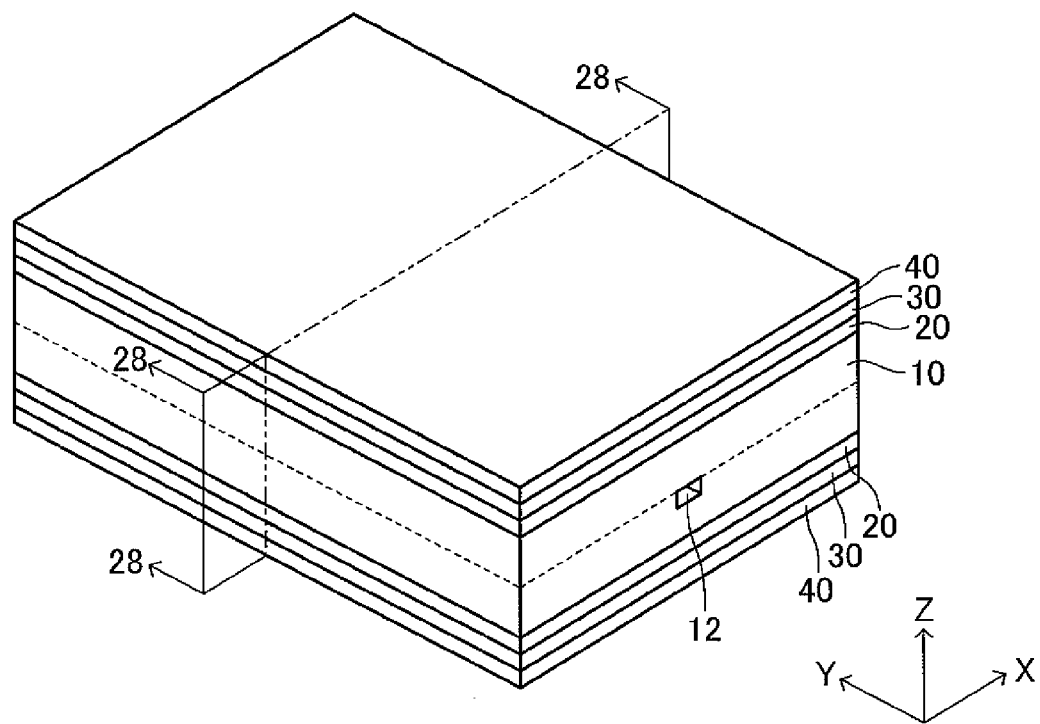
FIG. 27 is a perspective view illustrating an SOFC cell manufactured by the manufacturing method of an SOFC cell according to a modification of the present invention, wherein a single compact (=stacked compact) of the divided member of the SOFC cell having the channel pattern formed thereon and a single compact (=stacked compact) of the divided member of the SOFC cell having no channel pattern formed thereon are bonded to each other.
Figure 28:
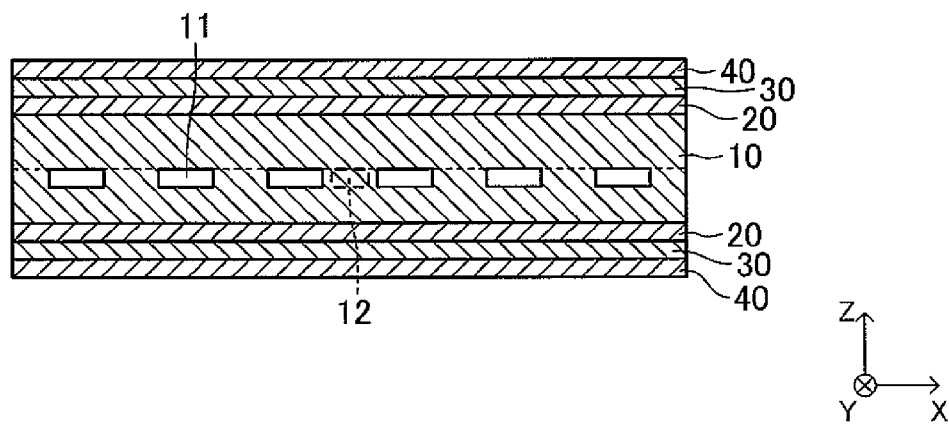
FIG. 28 is a sectional view illustrating a section obtained by cutting the SOFC cell illustrated in FIG. 27 along a plane that includes 28-28 line and that is parallel to the X-Z plane.

In the SOFC cell A described above, the two compacts (=stacked compacts) of the SOFC cell divided member, each having the channel pattern formed thereon, are bonded to each other. However, a single compact (=stacked compact) of an SOFC cell divided member having no channel pattern formed thereon and a single compact (stacked compact) of an SOFC cell divided member having a channel pattern formed thereon are bonded to each other, whereby an SOFC cell in which at least a solid electrolyte and an oxygen-side electrode are stacked on the upper and lower surfaces of the support member can be formed as illustrated in FIGS. 27 and 28.

Figure 29:
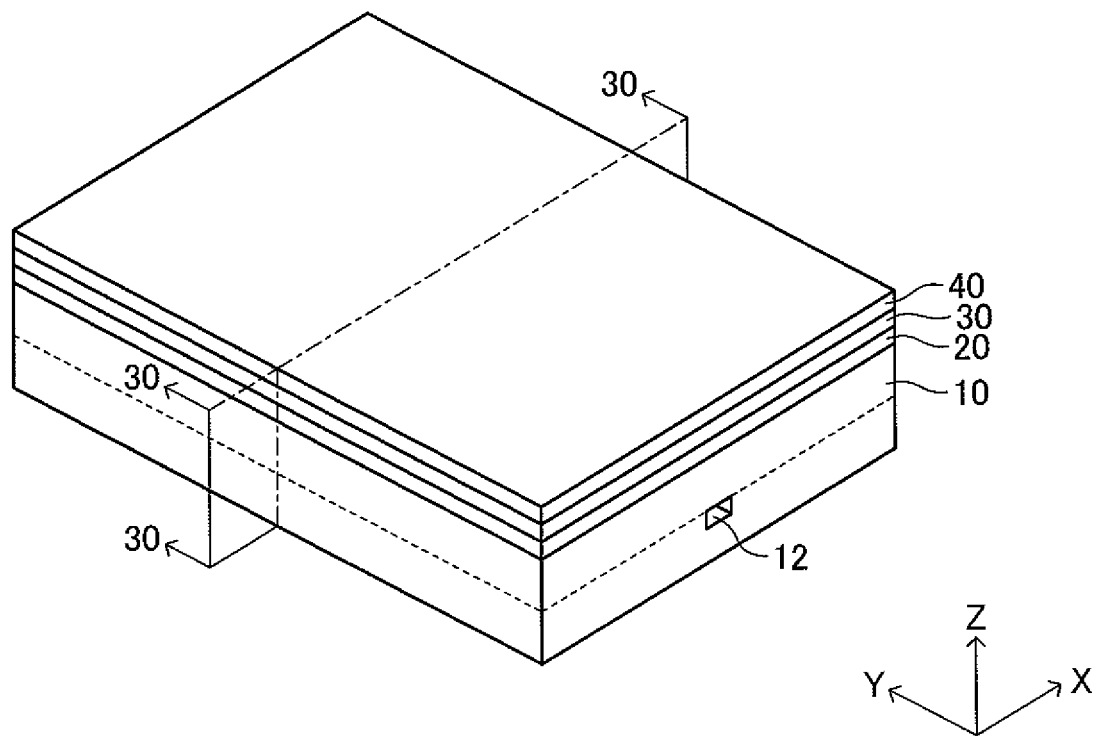
FIG. 29 is a perspective view illustrating an SOFC cell manufactured by the manufacturing method of an SOFC cell according to a modification of the present invention, wherein a single compact (=stacked compact) of the divided member of the SOFC cell having no channel pattern formed thereon and a single compact (=individual compact) of the support-member divided-member having the channel pattern formed thereon are bonded to each other.
Figure 30:
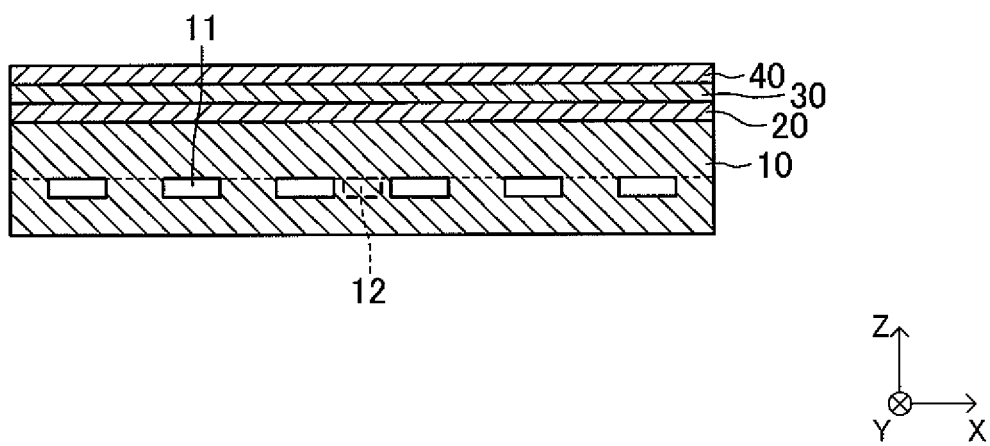
FIG. 30 is a sectional view illustrating a section obtained by cutting the SOFC cell illustrated in FIG. 29 along a plane that includes 30-30 line and that is parallel to the X-Z plane.

In the SOFC cell A" described above, a single compact (=stacked compact) of the SOFC cell divided member having the channel pattern formed thereon and a single compact (=individual compact) of the support-member divided-member having the channel pattern formed thereon are bonded to each other. However, as illustrated in FIGS. 29 and 30, a single compact (=stacked compact) of the SOFC cell divided member having no channel pattern formed thereon and the single compact (=individual compact) of the support-member divided-member having the channel pattern formed thereon are bonded to each other, whereby an SOFC cell in which at least the solid electrolyte and the oxygen-side electrode are stacked onto only one of the upper and lower surfaces of the support member can be formed.

Figure 31:
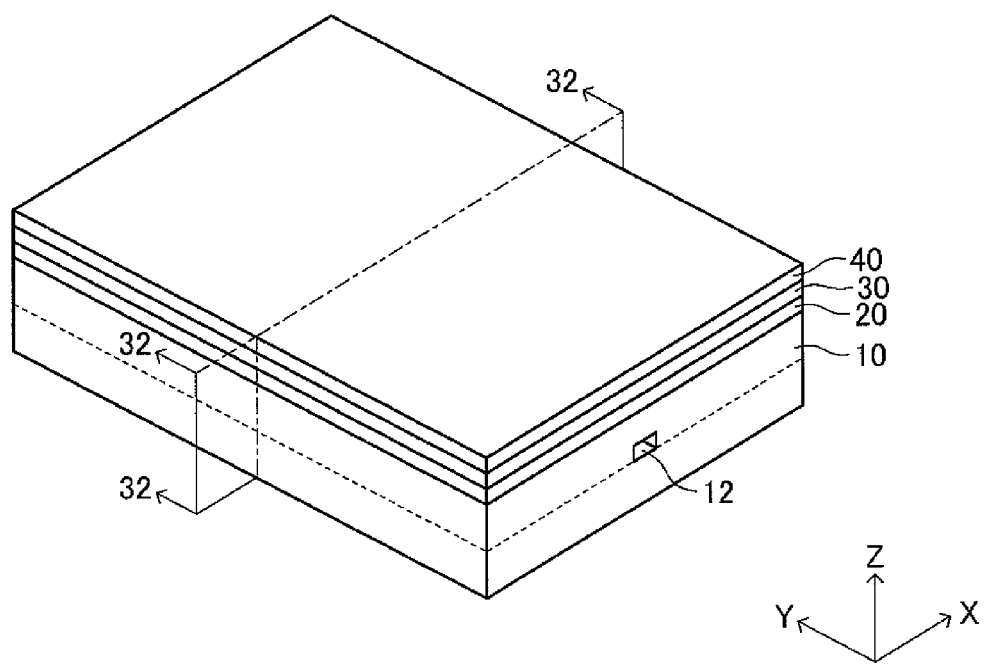
FIG. 31 is a perspective view illustrating an SOFC cell manufactured by the manufacturing method of an SOFC cell according to a modification of the present invention, wherein a single compact (=stacked compact) of the divided member of the SOFC cell having the channel pattern formed thereon and a single compact (=individual compact) of the support-member divided-member having no channel pattern formed thereon are bonded to each other.
Figure 32:
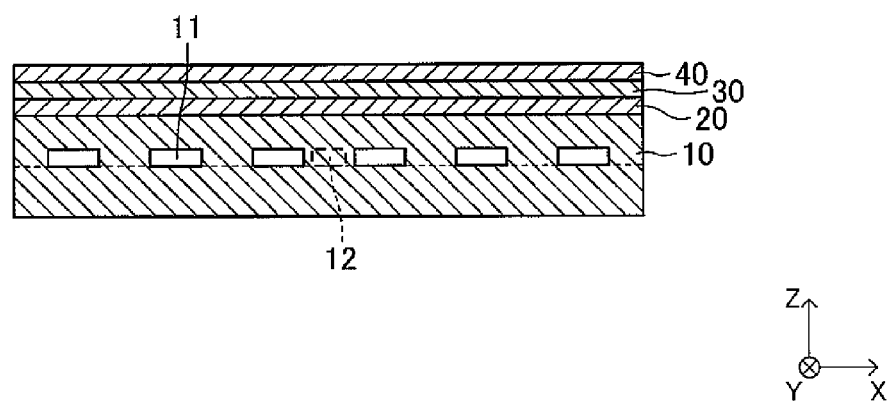
FIG. 32 is a sectional view illustrating a section obtained by cutting the SOFC cell illustrated in FIG. 31 along a plane that includes 32-32 line and that is parallel to the X-Z plane.

In the SOFC cell A" described above, a single compact (=stacked compact) of the SOFC cell divided member having the channel pattern formed thereon and a single compact (=individual compact) of the support-member divided-member having the channel pattern formed thereon are bonded to each other. However, as illustrated in FIGS. 31 and 32, a single compact (=stacked compact) of the SOFC cell divided member having no channel pattern formed thereon and a single compact (=individual compact) of the support-member divided-member having no channel pattern formed thereon are bonded to each other, whereby an SOFC cell in which at least the solid electrolyte and the oxygen-side electrode are stacked onto only one of the upper and lower surfaces of the support member can be formed.

What is claimed is:

1. A manufacturing method of a compact of a divided member of a solid oxide fuel cell in which at least a compact of a solid electrolyte is stacked on an upper surface of a compact of a support-member divided-member, which is obtained by dividing a plate-like support member having a gas channel formed therein in a thickness direction, and which has a channel pattern corresponding to the gas channel formed on its lower surface, the method comprising:

a molding process in which ceramic slurry containing at least ceramic powder, dispersion media, and a gelling agent is injected to a molding die having a pattern corresponding to the channel pattern formed on a molding surface at its bottom wall, and the slurry is molded and hardened by gel casting to obtain the compact of the support-member divided-member, wherein the ceramic slurry contains powder of NiO and powder of YSZ as the ceramic powder, a median size of an NiO particle constituting the NiO powder is in a range from 0.1 to 5.0 μm, and a median size of a YSZ particle constituting the YSZ powder is in a range from 0.1 to 5.0 μm, and the gelling agent is a precursor of one of phenolic resin, urethane resin and acrylic resin;

a stacking process in which at least a compact of a solid electrolyte is formed on the upper surface of the compact of the support-member divided-member in a state in which the upper surface of the compact of the support-member divided-member is exposed, and the compact of the support-member divided-member is accommodated in the molding die or a die that is different from the molding die having the pattern corresponding to the channel pattern formed on its bottom wall, in order to form a stacked compact; and a mold release process in which the molding die or the die different from the molding die is removed from the stacked compact to form the compact of the divided member of the solid oxide fuel cell.

2. The manufacturing process of a compact of a divided member of a solid oxide fuel cell according to claim 1, wherein in the stacking process, the one in which a compact of a fuel-side electrode is formed on the upper surface of the compact of the support-member divided-member, and the compact of the solid electrolyte is formed on the upper surface of the compact of the fuel-side electrode is formed as the stacked compact.

3. The manufacturing process of a compact of a divided member of a solid oxide fuel cell according to claim 1, wherein in the molding process, the compact of the support-member divided-member serving as a compact of a fuel-side electrode is formed, and in the stacking process, the one in which the compact of the solid electrolyte is formed on the upper surface of the compact of the support-member divided-member is formed as the stacked compact.

4. A manufacturing method of a solid oxide fuel cell comprising:

a bonding process in which two compacts of the divided-member of the solid oxide fuel cell, which are manufactured by the manufacturing process of the compact of the divided member of the solid oxide fuel cell according to claim 2, are bonded in such a manner that the surfaces having the channel pattern formed thereon are bonded, and the bonded compact is sintered, or the manufactured two compacts of the divided member of the solid oxide fuel cell are sintered, and the two divided members of the solid oxide fuel cell formed through the sintering are bonded in such a manner that the surfaces having the channel pattern formed thereon are bonded, whereby a bonded stacked body having at least a solid electrolyte formed respectively on the upper and lower surfaces of the support member is formed;

an electrode forming process in which a compact of an oxygen-side electrode is formed respectively on the upper and lower surfaces of the bonded stacked body obtained by the bonding process; and an electrode sintering process in which the compact of the oxygen-side electrode formed in the electrode forming process is sintered to form a solid oxide fuel cell.

5. A manufacturing method of a solid oxide fuel cell comprising:

a bonding process in which a single compact of the divided-member of the solid oxide fuel cell, which is manufactured by the manufacturing process of the compact of the divided member of the solid oxide fuel cell according to claim 2, and a single compact of the support-member divided-member formed by the molding process are bonded in such a manner that the surfaces having the channel pattern formed thereon are bonded, and the bonded compact is sintered, or the manufactured single compact of the divided member of the solid oxide fuel cell and the manufactured single compact of the support-member divided-member are sintered, and the single divided member of the solid oxide fuel cell formed through the sintering and the single support-member divided-member formed through the sintering are bonded in such a manner that the surfaces having the channel pattern formed thereon are bonded, whereby a bonded stacked body having at least a solid electrolyte formed on only one of the upper and lower surfaces of the support member is formed;

an electrode forming process in which a compact of an oxygen-side electrode is formed on only one of the upper and lower surfaces of the bonded stacked body obtained by the bonding process; and an electrode sintering process in which the compact of the oxygen-side electrode formed in the electrode forming process is sintered to form a solid oxide fuel cell.

6. The manufacturing method of a solid oxide fuel cell according to claim 4, wherein as one of two compacts of the divided member of the solid oxide fuel cell, a channel-free compact in which the channel pattern is not formed on the surface corresponding to the surface of the compact having the channel pattern formed thereon is used instead of the compact, and in the bonding process, the surface of the compact having the channel pattern formed thereon and the surface of the channel-free compact having no channel pattern formed thereon are bonded to form the bonded stacked body.

7. The manufacturing method of a solid oxide fuel cell according to claim 5, wherein a channel-free compact in which the channel pattern is not formed on the surface corresponding to the surface of the compact having the channel pattern formed thereon is used instead of the single compact of the divided member of the solid oxide fuel cell, and in the bonding process, the surface of the single compact of the support-member divided-member having the channel pattern formed thereon and the surface of the channel-free compact having no channel pattern formed thereon are bonded to form the bonded stacked body.

8. The manufacturing method of a solid oxide fuel cell according to claim 5, wherein a channel-free compact in which the channel pattern is not formed on the surface corresponding to the surface of the compact having the channel pattern formed thereon is used instead of the single compact of the support-member divided-member, and in the bonding process, the surface of the single compact of the divided member of the solid oxide fuel cell having the channel pattern formed thereon and the surface of the channel-free compact having no channel pattern formed thereon are bonded to form the bonded stacked body.

9. A manufacturing method of a solid oxide fuel cell comprising:

a bonding process in which two compacts of the divided-member of the solid oxide fuel cell, which are manufactured by the manufacturing process of the compact of the divided member of the solid oxide fuel cell according to claim 3, are bonded in such a manner that the surfaces having the channel pattern formed thereon are bonded, and the bonded compact is sintered, or the manufactured two compacts of the divided member of the solid oxide fuel cell are sintered, and the two divided members of the solid oxide fuel cell formed through the sintering are bonded in such a manner that the surfaces having the channel pattern formed thereon are bonded, whereby a bonded stacked body having at least a solid electrolyte formed respectively on the upper and lower surfaces of the support member is formed;

an electrode forming process in which a compact of an oxygen-side electrode is formed respectively on the upper and lower surfaces of the bonded stacked body obtained by the bonding process; and an electrode sintering process in which the compact of the oxygen-side electrode formed in the electrode forming process is sintered to form a solid oxide fuel cell.

10. A manufacturing method of a solid oxide fuel cell comprising:

a bonding process in which a single compact of the divided-member of the solid oxide fuel cell, which is manufactured by the manufacturing process of the compact of the divided member of the solid oxide fuel cell according to claim 3, and a single compact of the support-member divided-member formed by the molding process are bonded in such a manner that the surfaces having the channel pattern formed thereon are bonded, and the bonded compact is sintered, or the manufactured single compact of the divided member of the solid oxide fuel cell and the manufactured single compact of the support-member divided-member are sintered, and the single divided member of the solid oxide fuel cell formed through the sintering and the single support-member divided-member formed through the sintering are bonded in such a manner that the surfaces having the channel pattern formed thereon are bonded, whereby a bonded stacked body having at least a solid electrolyte formed on only one of the upper and lower surfaces of the support member is formed;

an electrode forming process in which a compact of an oxygen-side electrode is formed on only one of the upper and lower surfaces of the bonded stacked body obtained by the bonding process; and an electrode sintering process in which the compact of the oxygen-side electrode formed in the electrode forming process is sintered to form a solid oxide fuel cell.

* * * * *